United States Patent
Wylie et al.

(10) Patent No.: US 11,838,834 B2
(45) Date of Patent: Dec. 5, 2023

(54) SYSTEMS AND METHODS FOR DISPLAYING IMAGES ACROSS MULTIPLE DEVICES

(71) Applicant: Appix Project Inc., Vancouver (CA)

(72) Inventors: Aaron James Wylie, Vancouver (CA); Benjamin Joseph Wylie, Vancouver (CA); Jacob Tummond, Beaverton, OR (US); Luke Carey Bornn, Surrey (CA)

(73) Assignee: Appix Project Inc., Vancouver (CA)

( * ) Notice: Subject to any disclaimer, the term of this patent is extended or adjusted under 35 U.S.C. 154(b) by 0 days.

(21) Appl. No.: 16/472,138

(22) PCT Filed: Dec. 20, 2017

(86) PCT No.: PCT/CA2017/051555
§ 371 (c)(1),
(2) Date: Jun. 20, 2019

(87) PCT Pub. No.: WO2018/112632
PCT Pub. Date: Jun. 28, 2018

(65) Prior Publication Data
US 2020/0021966 A1     Jan. 16, 2020

Related U.S. Application Data

(60) Provisional application No. 62/436,652, filed on Dec. 20, 2016.

(51) Int. Cl.
*H04W 4/30*     (2018.01)
*H04W 4/80*     (2018.01)
(Continued)

(52) U.S. Cl.
CPC ............... *H04W 4/30* (2018.02); *G01S 5/26* (2013.01); *H04W 4/021* (2013.01); *H04W 4/80* (2018.02);
(Continued)

(58) Field of Classification Search
None
See application file for complete search history.

(56) References Cited

U.S. PATENT DOCUMENTS 7,697,925 B1 *  4/2010  Wilson ............... H04M 1/22
                                               455/418
7,916,577 B2 *  3/2011  Jeong ................ G01S 5/30
                                               367/128
(Continued)

FOREIGN PATENT DOCUMENTS

CN      103975374 A     8/2014
WO      2014096861 A2   6/2014

OTHER PUBLICATIONS

Filonenko, V. Asynchronous Ultrasonic Trilateration for Indoor Positioning of Mobile Phones, Doctoral Thesis, Dublin Institute of Technology, 2012.

*Primary Examiner* — Christopher T Wyllie
(74) *Attorney, Agent, or Firm* — McCarthy Tetrault LLP

(57) ABSTRACT

A lightshow control system for generating a lightshow across a plurality of pixels or mobile devices comprises a controller configured to receive a lightshow operator's input and to generate a plurality of lightshow parameters. The system comprises a beacon transmitter in communication with the lightshow controller and configured to receive the lightshow parameters from the lightshow controller, encode the lightshow parameters on a beacon signal, and broadcast the beacon signal to the pixels, wherein each pixel is configured to receive and decode the beacon signal to perform one or more display actions. The decoded beacon signal includes reference timing information to facilitate synchronization of the pixels. The display actions may be based in part on the individual pixel location which is
(Continued)

determined by the pixel based on TDOA multilateration and/or trilateration from distinct audio signals emitted by a plurality of speaker nodes.

35 Claims, 14 Drawing Sheets

(51) Int. Cl.
| | |
|---|---|
| *H05B 47/155* | (2020.01) |
| *G01S 5/26* | (2006.01) |
| *H04W 4/021* | (2018.01) |
| *H04W 40/24* | (2009.01) |
| *H04W 88/02* | (2009.01) |
| *H05B 47/19* | (2020.01) |

(52) U.S. Cl.
CPC ......... *H04W 40/244* (2013.01); *H04W 88/02* (2013.01); *H05B 47/155* (2020.01); *H05B 47/19* (2020.01)

(56) References Cited

U.S. PATENT DOCUMENTS

| | | | | |
|---|---|---|---|---|
| 8,705,320 | B1* | 4/2014 | Holt | G01S 3/8083 367/125 |
| 9,215,018 | B2* | 12/2015 | Czapla | H05B 47/16 |
| 10,169,985 | B1* | 1/2019 | Rader | G08C 23/02 |
| 2002/0113735 | A1* | 8/2002 | Spratt | G01S 5/14 342/464 |
| 2008/0247352 | A1* | 10/2008 | Martin | H04W 56/009 370/316 |
| 2009/0190441 | A1* | 7/2009 | Zhao | G01S 15/876 367/128 |
| 2009/0230895 | A1* | 9/2009 | De Prycker | H05B 47/155 315/317 |
| 2012/0105466 | A1* | 5/2012 | Leslie | H05B 47/155 345/589 |
| 2013/0083631 | A1* | 4/2013 | Harrell | G01S 5/18 367/127 |
| 2014/0105395 | A1* | 4/2014 | Hart | H04W 4/029 380/259 |
| 2014/0112102 | A1* | 4/2014 | Calvarese | G01S 1/752 367/118 |
| 2014/0133656 | A1* | 5/2014 | Wurster | H04W 4/023 380/270 |
| 2014/0184386 | A1* | 7/2014 | Regler | G08B 5/228 340/7.61 |
| 2014/0192622 | A1* | 7/2014 | Rowe | G01S 5/18 367/117 |
| 2015/0012308 | A1* | 1/2015 | Snyder | H05B 47/155 705/5 |
| 2015/0022563 | A1* | 1/2015 | O'Donnell | H05B 47/155 345/88 |
| 2015/0081071 | A1* | 3/2015 | Lea | G10L 19/018 700/94 |
| 2015/0334569 | A1* | 11/2015 | Rangarajan | H04W 12/122 726/4 |
| 2015/0334676 | A1* | 11/2015 | Hart | H04W 64/003 455/456.1 |
| 2018/0247352 | A1 | 8/2018 | Rogers | |
| 2020/0021966 | A1* | 1/2020 | Wylie | G06F 3/1446 |

* cited by examiner

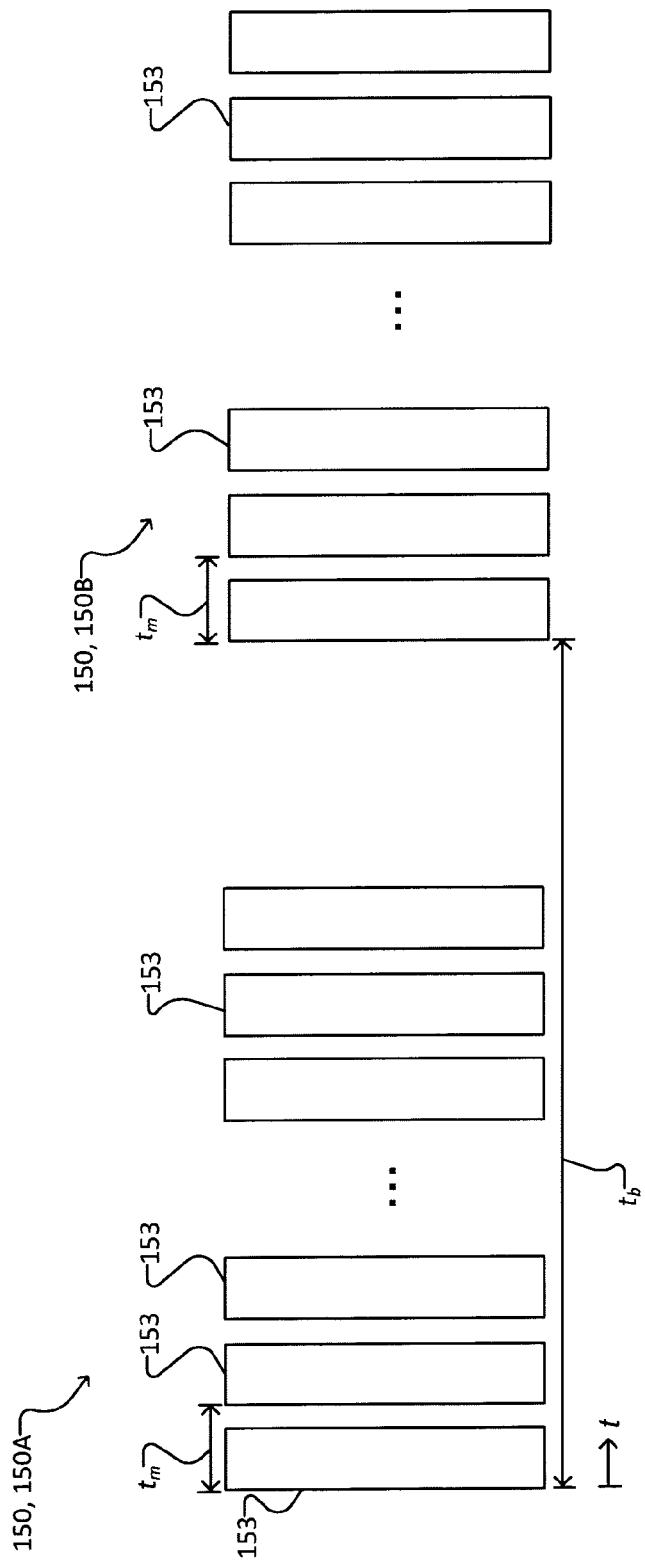

SYSTEMS AND METHODS FOR DISPLAYING IMAGES ACROSS MULTIPLE DEVICES

REFERENCE TO RELATED APPLICATIONS

This application claims priority from U.S. Application No. 62/436,652 filed on 20 Dec. 2016 and entitled SYSTEMS AND METHODS FOR DISPLAYING IMAGES ACROSS MULTIPLE DEVICES. For purposes of the United States, this application claims the benefit under 35 U.S.C. § 119 of U.S. Application No. 62/436,652 filed on 20 Dec. 2016 and entitled SYSTEMS AND METHODS FOR DISPLAYING IMAGES ACROSS MULTIPLE DEVICES which is hereby incorporated herein by reference for all purposes.

TECHNICAL FIELD

This invention relates to technologies for producing audience participation lightshows at live events.

BACKGROUND

At a music concert, show, production, sporting event or other live event, the event attendees may be encouraged to engage in an audience or crowd participation lightshow to enhance the experience of the live event. Typically, to produce such lightshows, the audience members are provided with a device that has one or more light-emitting diodes (LEDs) that cause the device to light up or pulsate with light during the event. Such devices may be wearable devices, such as, for example, a wristband or a necklace. Alternately, such devices may include a ball or other object that can be held by the audience member or that is designed to float over the crowd. The device may be wirelessly-controlled to turn the device's LEDs on and off during the live event. Transmitters stationed at the live event may send commands modulated onto infrared (IR) or radio frequency (RF) signals to receivers embedded in the device. The device may have a microprocessor which controls the LEDs based on the signal detected at the receiver. In this manner, the devices may be controlled to light up or pulsate during a show.

These crowd participation devices, however, are often one-time use items which must be manufactured anew for each live event, adding to the costs of providing the crowd participation lightshow for the event. In addition, there are environmental costs associated with producing an item that can only be used once or a few times. In addition, particular limitations for IR-controlled devices include the possibility of stage smoke interfering with the signals and therefore impacting the overall lighting effects. IR signals may also adversely affect a mobile phone or other camera's view of the show.

US2015/0081071 to Wham City Lights Inc. discloses using mobile devices carried by the event attendees to generate a lightshow at a live event. Data is modulated onto an audio signal which is transmitted from a speaker to a computing device. The action on the computing device that is triggered by the data is based on when the audio signal was received. Therefore, if the computing devices receive the audio signals at different times (due to the limitations of using sound waves for carrying the signal, which travel at significantly lower speeds than other wireless signals that travel at the speed of light), then the lightshow will lack synchronization across the devices. This reference also does not disclose how to determine a location of each device at the venue and does not provide the capability of editing lightshow effects while the show is in progress.

In some systems, an address is assigned to each device corresponding to a location in the venue where the audience member is expected to be. For example, the address may be the audience member's assigned seat number, or a general section of the arena where the audience member's seat number is located. The devices may be controlled based on the assigned address so as to be able to create different lighting effects based on the audience members' assigned locations. However, these methods rely on the audience member being at the location that corresponds to the assigned address on their device. The methods do not work if the audience members move around to different locations during a live event. These methods also do not work for general seating situations where there is no way to predict where an audience member will be located during the show within the general seating or general admission area.

Another way to address a device, particularly for Global Positioning Satellite (GPS)-enabled devices, is to use GPS information to determine the location of a device. However, since radio signals broadcast from GPS satellites have difficulty penetrating through the walls of buildings, GPS signals can be unreliable for determining a location of a mobile device within a building. Even if GPS signals are receivable by a device, the location coordinates that are determined using GPS signals are not highly precise or accurate. For example, certain GPS signals may be capable of pinpointing the device's location within approximately 8 meters of the device's actual location, with a 95% confidence level. Thus, GPS signals can identify at most approximate locations of a device and sometimes identify the locations incorrectly, or not at all in cases where the GPS signals are blocked by building walls.

Other ways to address a device are to determine its relative position to a transmitter, such as a Bluetooth transmitter or a WiFi transmitter, by measuring the signal strength at the device. However, the locations determined using these methods are often imprecise. For example, low-energy Bluetooth iBeacon Received Signal Strength Indicator (RSSI) values are intended to provide only three distance measurements: far, near and immediate. Triangulating with a meaningful level of granularity for a lightshow using these three levels of feedback is difficult or impractical as the beacon signals will bounce off of walls and be absorbed by various objects including people. In order to obtain a meaningful reading, beacons would have to be placed every 3 to 4 meters, approximately. This would be virtually impossible in a stadium setting. Even if they were placed in those positions, the accuracy of the location determination would still only be for approximately 1 to 2 meters. Additionally, the amount of simultaneous Bluetooth signals running through the environment would generally be too much for mobile phones to process. The use of WiFi transmitters to estimate locations, based on signal strength, presents similar difficulties. Additionally, there are load implications and challenges to set up a WiFi network to handle all the devices that would need to connect to it during an event.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a lightshow control system for generating a lightshow across a plurality of pixel devices. The lightshow may be used to engage an audience or crowd at a live event such as a music concert, show, production, sporting or racing event, fireworks display wherein the audience members hold, carry or wear the pixels for the lightshow display. In particular embodiments, the pixel devices comprise handheld mobile device, such as for example, a smartphone or a tablet. The system comprises a controller which receives input from a lightshow operator and generates a plurality of lightshow parameters based on such input. The system further comprises one or more beacon transmitters in communication with the lightshow controller and configured to receive the lightshow parameters from the lightshow controller, encode the lightshow parameters on a beacon signal, and broadcast the beacon signal to the pixel devices. For example, based on the plurality of lightshow parameters, the beacon transmitter may be configured to encode a play scene command on the beacon signal, wherein the play scene command is defined by one or more of: a scene type, a set of color IDs, a gradient speed, a scene transition, and Beats Per Minute (bpm). The lightshow controller may be configured to provide a graphical user interface via its display to receive input from the lightshow operator and enable dynamic and real time generation and modification of the lightshow parameters based on such input. Each of the pixel devices is configured to receive and decode the beacon signal to perform one or more display actions for the lightshow based on the decoded beacon signal. The beacon transmitters may comprise a Bluetooth Low Energy (BLE) beacon transmitters. A plurality of beacon transmitters may be employed at the live events venue to ensure coverage and provide redundancy in case of failure by one or more transmitters.

In some embodiments, a timing reference is encoded on the beacon signal to synchronize performance of the display action across the pixel devices. The timing reference may comprise a time since a starting reference point, such as a first beat of the lightshow or a first beat of the current lightshow scene. Based on the plurality of lightshow parameters, the beacon transmitter may be configured to encode a heartbeat message on the beacon signal, wherein the heartbeat message is defined by the timing reference and one or more of: bpm, a beat mode type, a time signature and a speed of sound.

The beacon transmitter may be configured to broadcast the beacon signal as one or more batches of repeated data packets, such as a batch of between 15 to 25 data packets. In particular embodiments, the time $t_m$ between transmission of successive data packets is between 15 ms to 30 ms, and the timing reference encoded in each of the data packets subsequent to the first data packet is incremented by $t_m$ from the timing reference encoded in the preceding data packet. In some embodiments, each beacon transmitter is configured to update the transmitter's Media Access Control (MAC) address to encode a new MAC address for each batch of data packets. In addition each beacon transmitter may be configured to encode a new identification number on the beacon signal for each batch of data packets.

Other aspects provide methods performed by a pixel device for contributing to a lightshow display across a plurality of such pixel devices. A particular embodiment of such methods comprises scanning for and receiving at the pixel device a beacon signal broadcast from a beacon transmitter; decoding the beacon signal to determine a plurality of lightshow parameters; and performing one or more display actions for the light show based on the lightshow parameters. The display actions may comprises one or more of: displaying at least one image or a series of images on a display screen of the pixel device; flashing a light source on the pixel device; and vibrating the pixel device. In addition, or in the alternative, the display actions may comprise displaying a scene for the lightshow, wherein the scene comprises a sequential display of colors displayed on a display screen of the pixel device, and the scene is characterized by one or more of: a scene type, a set of color IDs, a gradient speed, a scene transition, and bpm.

In some embodiments, the pixel devices scan for and receive a heartbeat signal broadcast from a beacon transmitter; and in response to not receiving the heartbeat signal within a heartbeat timeout period, are configured to stop the one or more display actions and/or restart the Bluetooth receiver. If a heartbeat signal is received then the pixel device decodes a timing reference from the heartbeat signal, and performs the display actions at a start time based on the timing reference.

A further aspect of the invention provides systems and methods for producing a lightshow wherein the display actions performed by the pixel devices are based on the pixels' individual locations. Thus, the lightshow display across all of the pixels can be controlled to display moving lines, spirals, swirls, halos or other effects. A locate pixel positioning system is provided to enable the pixel devices to identify their own location. The system comprises a positioning signal transmitter and a plurality of speaker nodes in communication with the positioning signal transmitter. Communication from the positioning signal transmitter to the speaker nodes may be implemented via Radio Frequency (RF) signals. To each speaker node, the positioning signal transmitter transmits a tone generation signal and in response to receiving the tone generation signal each of the speaker nodes generates and emits a unique audio signal which is recorded and played back by the pixel devices to enable Time Difference of Arrival (TDOA)-based trilateration and/or multilateration for position determination by the pixel devices. In particular embodiments, the audio signal is an ultrasonic audio signal (above the frequency of audible sound), such as an audio signal having a frequency in the range of 16 kHz to 24 kHz (although in other embodiments the frequency range can be different). Each of the speaker nodes is configured to emit the audio signal simultaneously with the other speaker nodes. The audio signals may comprise tones, chirps or other sounds. In particular embodiments, a cluster of four to six speaker nodes is employed at a live events venue and the speaker nodes are placed at different heights to enable three dimensional positioning determination by individual pixel devices using TDOA trilateration and/or multilateration.

In some embodiments the positioning signal transmitter is configured to transmit the tone generation signal as a plurality of RF signals at equally spaced time intervals to the speaker node cluster. Upon receiving each RF signal, each speaker node is configured to clock the time elapsed since the start of the preceding time interval and determine a signal generation time period based on a set of clocked times. For example, each speaker node may be configured to take the lowest of the set of clocked times as the signal generation time, wherein the speaker node generates and emits the audio signal when the signal generation time period following the start of the next time interval has elapsed. If the set of the clocked times have a spread of more than a certain predetermined threshold, such as 10 ms, the speaker node may be configured to wait out a round of RF signals by refraining from emitting an audio signal for the round.

In one embodiment of a method performed by pixel devices to determine the pixel's own location, the method comprises receiving at the pixel device a start recording signal; in response to receiving the start recording signal, recording a plurality of audio signals emitted concurrently from a plurality of speaker nodes, wherein each speaker node emits an audio signal in a frequency distinct from the other speaker nodes; filtering and processing the audio signals based on their distinct frequencies to determine differences between time of arrival for each audio signal (TDOA); receiving location information for each of the plurality of speaker nodes; and based at least in part on the TDOA and the location information, determining the location of the pixel device using trilateration and/or multilateration. Speaker node location information, speaker node tone IDs and/or a value for speed of sound which are used by the pixels for the trilateration and multilateration calculations may be decoded from beacon signals transmitted by the beacon transmitters to the pixel devices. Each of the pixel devices receives display commands for an animated scene and identifies the one or more display actions to be performed by the pixel device based on its corresponding location in a display representation of the animated scene.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIG. 4 schematically illustrates multiple copies of data packets that are transmitted in batches by a beacon transmitter in accordance with one embodiment.

DESCRIPTION

Figure 1:
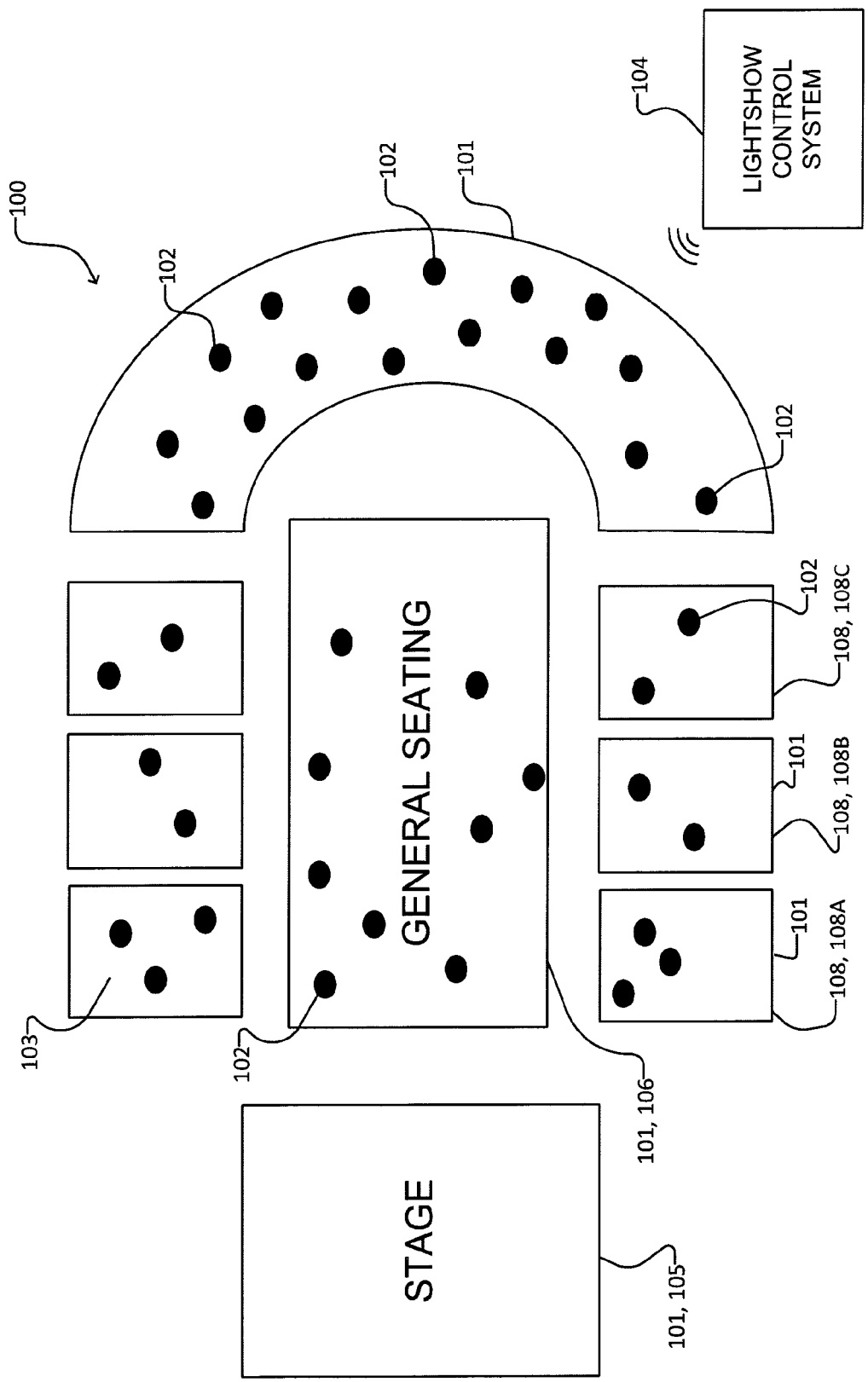
FIG. 1 schematically shows a top plan view of a venue for the production of a lightshow in accordance with the methods and systems described herein.

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Particular embodiments provide methods and systems for producing a synchronized lightshow. The lightshow may be generated to engage the crowd at a music concert, show, production, sporting or racing event, fireworks display or other live event. Scenes of the lightshow are played on a plurality of mobile devices participating in the lightshow. The participating mobile devices collectively provide a multi-pixel display wherein each pixel of the display comprises one mobile device. Lightshow commands for the display of a lightshow scene are broadcast to the pixels. During a performance, a producer of the lightshow may develop different scenes to be displayed in real time and dynamically set the lightshow scene parameters that are broadcast to the pixels. Lightshow scene parameters may be transmitted to the pixels by way of a Bluetooth Low Energy (BLE) signal which is broadcast by one or more transmitters (beacons) located at the venue of the live event. Each pixel is configured to scan for a BLE signal from a beacon and, in response to receiving the BLE signal, decode the received BLE signal and perform one or more particular actions based on the information contained in the BLE signal.

In some embodiments, a heartbeat signal is also broadcast periodically by the beacon to the pixels. The heartbeat signal can be used to facilitate synchronization of the pixels in the lightshow. In particular embodiments, the information that is encoded in a heartbeat signal may include information such as beats per minute (bpm), a time signature (e.g. 2/4, 3/4, or 4/4 time or the like), the current speed of sound given the temperature in the venue and the height of the venue above mean sea level (AMSL), and a time since beat one or some other timing reference. Upon decoding this information, the pixel will be able to determine when it should start playing the next scene (exactly in time, i.e. within for example 5 milliseconds in certain embodiments). The heartbeat signal can also be used to monitor a pixel's responsiveness and ensure that the pixel has detected a recent heartbeat signal to use as a timing reference. The elapse of a period of time (a heartbeat time-out period) without having received a heartbeat signal at a pixel may result in the pixel being excluded from the lightshow until the pixel detects a new heartbeat signal.

Each pixel of the lightshow display may be controlled based on the self-determined location of the pixel. In particular embodiments, a plurality of speaker nodes are stationed at different locations at the venue of the live event and are configured to emit audio signals. The audio signals may comprise periodic tones or the like in the ultrasonic frequency range. In certain embodiments the tones are emitted concurrently by the speakers. The speakers may be controlled so that each speaker emits a unique predetermined tone, different from the tone emitted by the other speakers, so that the tone functions as the unique ID (identifier) of that speaker. Each pixel is configured to listen for and record the tones from the speakers, play back and process the recorded signals to determine a time difference of arrival (TDOA) of each tone, and, using TDOA hyperbolic trilateration and/or multilateration methods and the known position of the speaker nodes, calculate the pixel's position. In other embodiments, other audio signals can be emitted by the speakers as the unique identifier of that speaker. For example, the speakers may emit audio chirps in which the frequency increases (up-chirp) or decreases (down-chirp) with time. Each speaker may emit an audio chirp with a different duration and/or a different start frequency and/or end frequency.

In particular embodiments four or more speaker nodes are used as the tone emitters. In some embodiments six speaker nodes are used. In still other embodiments, up to 16 speaker nodes are used. The speaker nodes may be placed in a particular arrangement at the venue of the live event. Where the pixels of the lightshow display are located at varying heights, then the speaker nodes may also be placed at different heights, to allow for three-dimensional positioning information to be determined by each pixel. The self-determined location information allows the pixels to function as independently self-addressed pixels of the multi-pixel display. The pixels can therefore be directed, based on their location, to perform a different action from other pixels in the display. In this manner, more complicated scenes can be displayed than simply causing all the pixels to display the same color and/or to light up or blink at the same time. For example, the pixels can be controlled to display moving lines, spirals, swirls, halos or other effects, or any other animation or image across an overall lightshow display formed by the pixels. This may be accomplished by incorporating an effects layer overlapping a representation of the lightshow display; the effects layer contains a representation of what the lightshow display (comprising all of the pixels engaged in the lightshow) should look like for each frame of the scene. By knowing where on the lightshow display it is located and knowing what the entire lightshow display should look like at each particular frame based on the effects layer, a pixel can determine the action that it needs to perform for each frame in order to contribute to the desired animation or image.

FIG. 1 schematically illustrates a venue 100 for the production of a lightshow using the methods and systems described herein. Venue 100 may be an indoor or outdoor stadium, arena, bowl, concert hall, theater, amphitheater, grandstand, field, beach, or other open area or the like which is suitable for holding a concert, sporting or racing event, show, production, fireworks display or other live event. Pixels 102 are shown at various locations in venue 100 and collectively make up a display 103 for the lightshow. Typically each pixel 102 is associated with a corresponding one of the event attendees engaging in the lightshow. Pixels 102 are controlled by a lightshow control system 104 to turn on/off to participate in the lightshow. For clarity and simplicity of illustration only representative pixels 102 are shown in FIG. 1, however, it is to be understood that pixels 102 may be more densely packed and more pixels 102 than as illustrated may participate in a lightshow, collectively forming a multi-pixel display 103 that displays a series of scenes for the lightshow. Pixels 102 may all be located on a level plane or they may be located at different heights at venues 100 having tiered, sloped or multi-level seating.

Figure 3A:
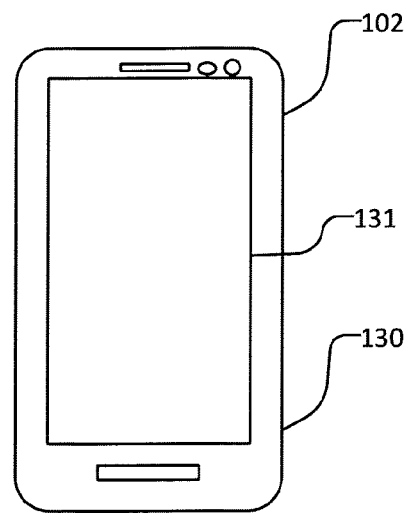
FIG. 3A shows a representative mobile device which may be used along with other mobile devices to implement a lightshow.

The terms "pixel" or "pixels", as used herein, refer to the smallest addressable element or area of illumination of lightshow display 103. In particular embodiments each pixel 102 comprises an event attendee's mobile device. In other embodiments, the pixels 102 may comprise other types of handheld devices that are capable of receiving signals broadcast by a beacon transmitter (or other transmitter employed to communicate lightshow command signals to the pixels). Referring to FIG. 3A, a representative mobile device 130 that can be used as a pixel 102 has a display screen 131 which serves as the pixel light source and is operable to light up and/or to display a particular color, thereby contributing a pixel 102 of that color to the lightshow display 103. The color image displayed by mobile device 130 may fill a portion of, or the entire region of, the display screen 131 with one color. The mobile device 130 can be controlled to sequentially display different colors during a lightshow. In some embodiments, mobile device 130 may be controlled to fill a region of the display screen 131 with more than one color at once, such as a gradient of colors. For example, the display screen 131 may display multiple colors temporarily when the screen is transitioning to the next color over a gradient transition. In some embodiments, mobile device 130 may be controlled to concurrently fill a portion of the display screen 131 with an image and/or video capture user interface which, for example, may be used to allow for taking of images and/or videos of a live event while mobile device 130 is also serving as a pixel 102 in display 103. In some embodiments the mobile device 130 incorporates one or more other light sources, such as, for example, an LED camera flash 136 seen in FIG. 3B, which may be activated to add another visual element to the lightshow.

In addition, mobile device 130 may have a vibrator 135 which may be activated during a lightshow by a vibrate mobile device command received from a beacon of lightshow control system 104. The activation of vibrator 135 can be used to communicate to the event attendee via haptic feedback. For example, vibration of the mobile device 130 may be used to signify to the event attendee carrying the mobile device 130 that the lightshow is starting. In order to better engage in the crowd participation lightshow, event attendees may be instructed to hold up their mobile devices 130 when they feel their mobile device 130 vibrating.

As seen in FIG. 1, venue 100 may have a plurality of sections 101, including one or more stages 105, one or more general seating areas 106, and one or more assigned seating areas 108 (e.g. 108A, 108B, 108C, etc.). The venue sections 101 illustrated in FIG. 1 are for representative purposes only, and may vary in number, layout, and configuration between different venues 100 to and different live events. Pixels 102 are located in those venue sections 101 where event attendees (with their mobile devices 130) may be found. Pixels 102 are controllable by lightshow control system 104 to turn on/off and display a color. By synchronizing such actions across the pixels 102 of display 103, a lightshow can be produced to engage the crowd and enhance the live event. In some scenes of the lightshow, all pixels 102 at venue 100 are controlled to perform the same action synchronously. In other scenes, pixels 102 are controlled to produce a particular image (still or moving) on multi-pixel display 103 (which means a pixel 102 could be displaying a different color from pixels 102 in other areas of the venue and/or may have its display screen ON whereas other pixels 102 have their display screens OFF). To produce such an image, a determination of whether to turn on the mobile device's display screen 131 and what color should be displayed on the display screen 131 at any one time may be based on the pixel's location information, such as self-determined location information as obtained using the methods and systems described herein.

Figure 2:
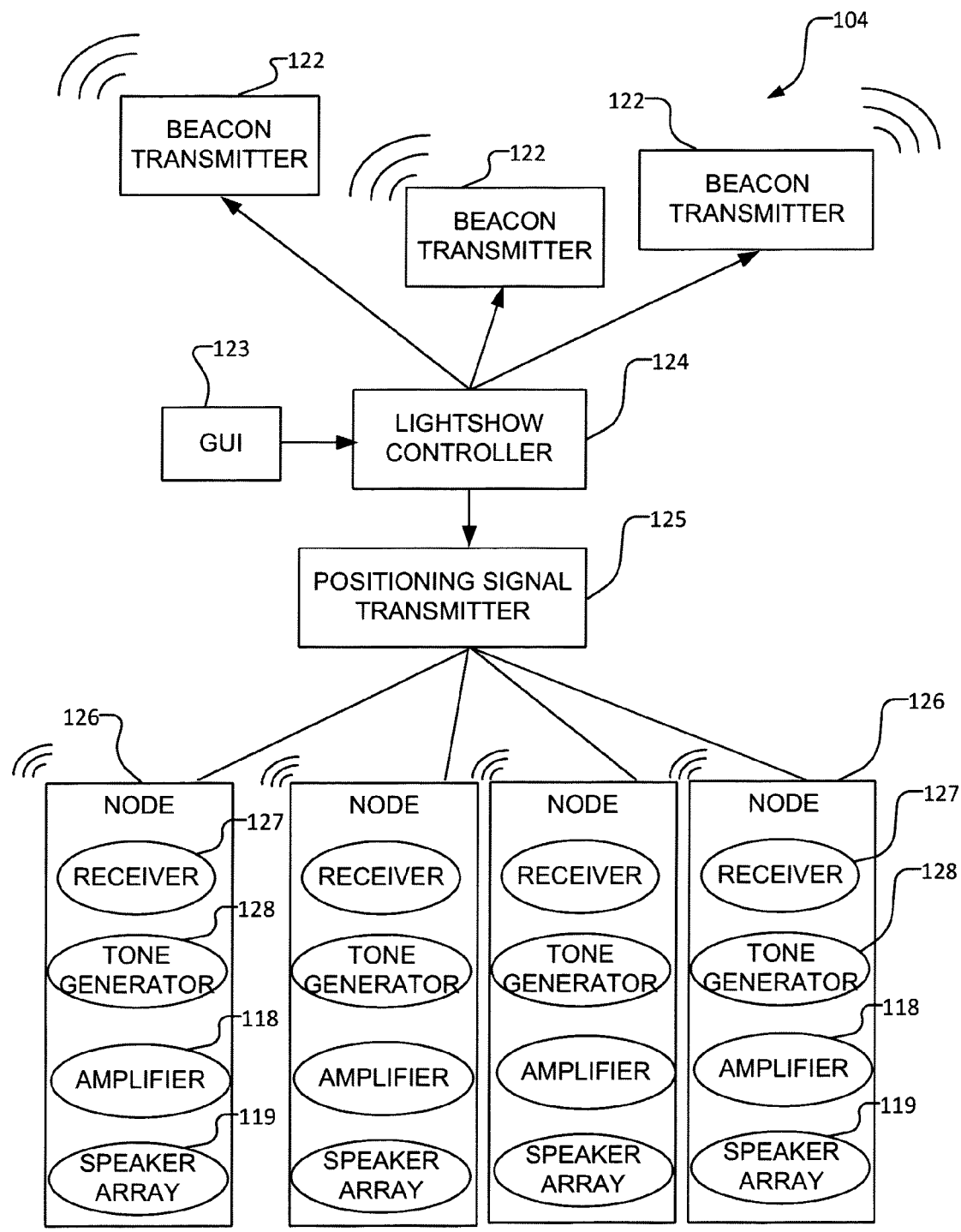
FIG. 2 shows a system according to one embodiment for implementing a lightshow using a plurality of pixels at a live events venue.

FIG. 2 depicts a lightshow control system 104 according to one embodiment for implementing a lightshow using a plurality of pixels 102 at a live events venue (such as venue 100 of FIG. 1). System 104 comprises a lightshow controller 124, one or more beacon transmitters 122 (individually and collectively, beacon transmitter 122) and a positioning signal transmitter 125. Lightshow controller 124 is in communication with and controls beacon transmitter 122 and positioning signal transmitter 125. System 104 also comprises a plurality of speaker nodes 126 which receive signals from and are controlled by positioning signal transmitter 125. As described in further detail below, each of the components of system 124 plays a part in enabling the production of a lightshow for a crowd of event attendees carrying mobile devices 130 by turning each mobile device 130 into a pixel 102 of a large multi-pixel display 103 extending over at least a portion of the venue 100. Display 103 may comprise a two-dimensional display where all of the pixels 102 are on the same plane or treated as if they are on the same plane (by projecting their locations onto a plane). In other embodiments, display 103 comprises a three-dimensional display. This may be the case for venues such as arenas, stadiums, bowls, amphitheaters, theaters, grandstands and the like which have tiered or multi-level seating, where pixels 102 are at different heights and may be controlled based on their location in three-dimensional space in order to generate the desired effects.

Lightshow controller 124 is configured to direct beacon transmitter 122 to periodically broadcast one-way BLE signals. For example, optical fiber, RF, WiFi or Ethernet connections and the like, could be used to relay one or more messages from lightshow controller 124 to beacon transmitter 122 to configure the beacon signals from beacon transmitter 122. The beacon signals from beacon transmitter 122 may be detected by pixels 102 which are located within the transmission range of the beacon transmitter 122. The number of beacon transmitters 122 employed for a venue 100 will depend on the range of the transmitter and/or redundancy considerations. In particular embodiments, beacon transmitter 122 has a transmission range of approximately 10 m to 500 m. To provide redundancy in case of transmitter failure and ensure transmission coverage for the venue 100, more than one beacon transmitter 122 may be located in the venue 100 to broadcast signals to the pixels 102 within the venue for producing the lightshow. Pixels 102 are configured to scan for the BLE signals that are broadcast by the beacon transmitter 122, decode the detected BLE signals, and in response to the decoded information, perform particular actions to generate the lightshow.

The lightshow controller 124 directs the beacon transmitter 122 to encode particular information on the BLE signals for producing the lightshow on the mobile devices 130 serving as pixels 102 for a lightshow display 103. Pixels 102 may comprise mobile devices 130 such as smartphones, tablets, and the like, or any other handheld device comprising a display screen or a light source that is capable of receiving and decoding the beacon signals and performing a display action based on the decoded signals. Such mobile devices 130 may be held by the audience members or may otherwise be carried or worn by the audience members (e.g. suspended from a neckstrap lanyard or wriststrap) such that their display screens or lights sources are visible to engage in the lightshow.

Figure 5A:
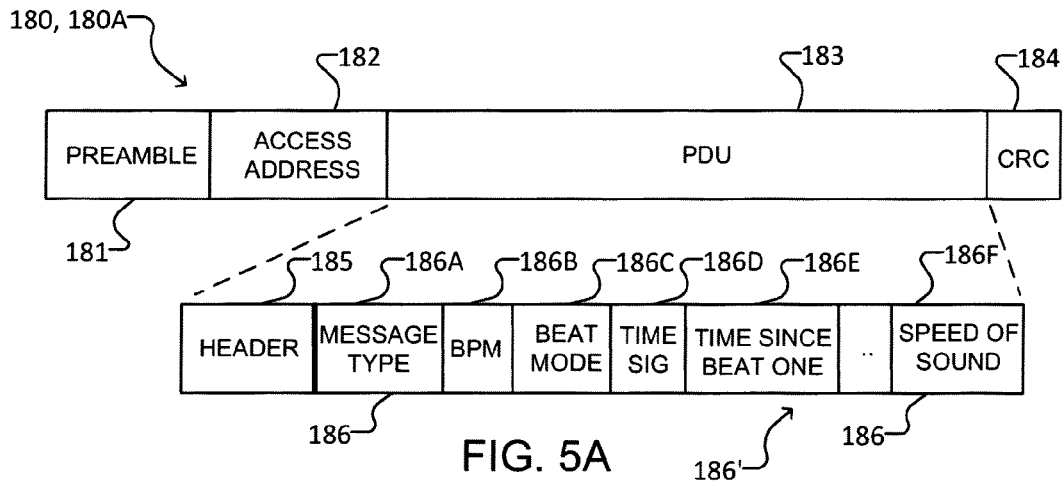
FIGS. 5A, 5B, and 5C illustrate data packets transmitted by a beacon transmitter in accordance with one embodiment, for a heartbeat message, a lightshow command message and a venue configuration message, respectively.
Figure 5B:
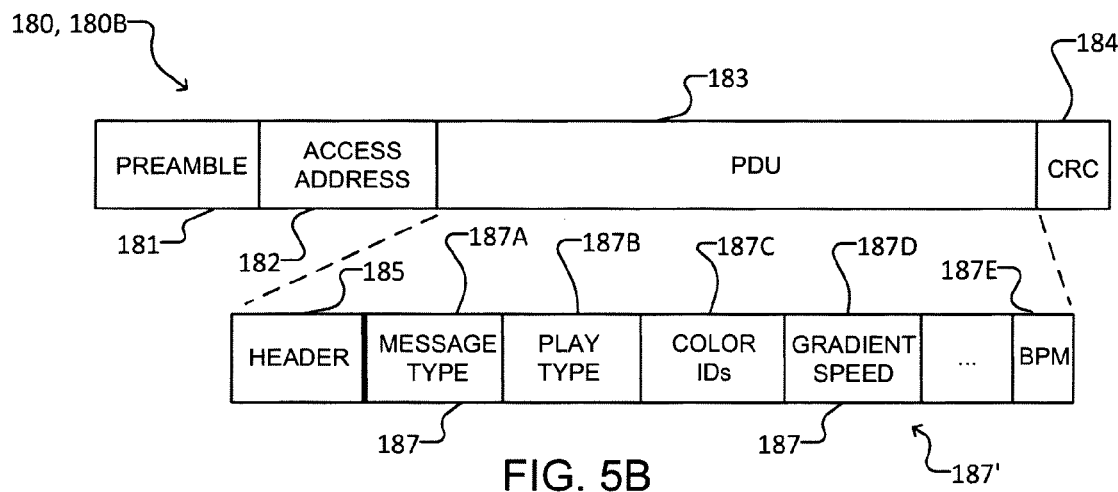
Figure 5C:
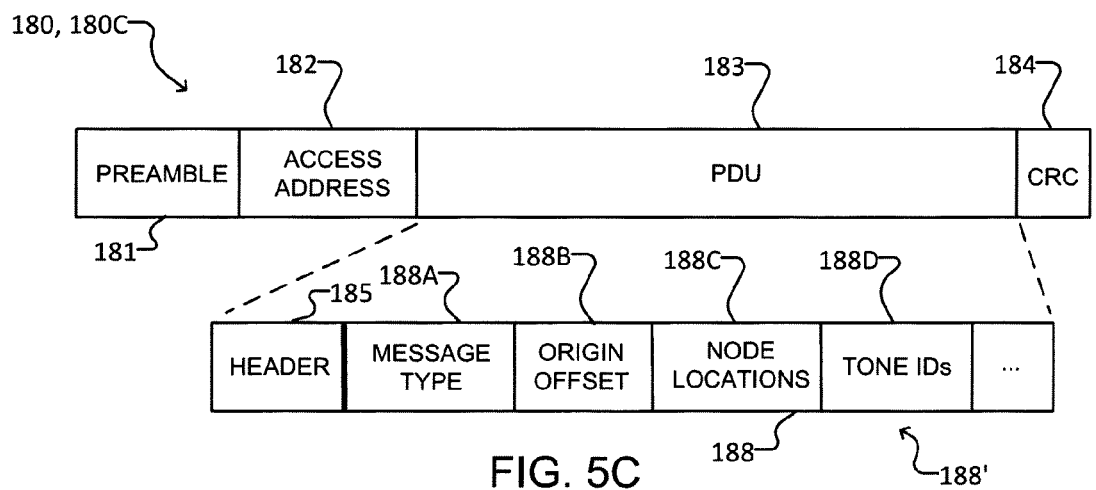

According to particular embodiments, the signals that are broadcast by beacon transmitter 122 include, but are not limited to: (1) lightshow command signals; (2) heartbeat signals; and (3) venue configuration signals. The structures, for example, data packets 180 for messages conveyed by these signals are illustrated in FIGS. 5A, 5B, and 5C (individually and collectively FIG. 5). The data packets 180 may be in accordance with a suitable BLE beacon communication protocol, such as for example, Eddystone beacon format. Lightshow command signals (e.g. which may be conveyed as data packets 180B seen in FIG. 5B) communicate to the pixels 102 the specific actions to perform for producing the lightshow (e.g. play scene, stop playing scene, play scene to the end of the phrase and stop, turn all pixels off, vibrate mobile device, activate LED flash, etc.). The heartbeat signals (e.g. which may be conveyed as data packets 180A seen in FIG. 5A) help to facilitate synchronization of the pixels 102 by communicating a timing reference. In some embodiments, two or more types of heartbeat signals are transmitted: 1) a first heartbeat signal to facilitate pixel synchronization using a timing reference, and 2) a second or more heartbeat signal which could convey tone IDs (identifying the tone that originates from each speaker node 126) to assist the pixels 102 in determining their own locations when the pixels are operating in location-aware mode. In some embodiments, rather than using the BLE signals to dynamically transmit lightshow commands to the mobile devices 130, a series of commands for producing a lightshow may be preloaded onto mobile devices 130 prior to the live event. In such embodiments, a heartbeat signal is broadcast by the beacon transmitters 122 to the mobile devices 130 to synchronize the performance of the lightshow commands preloaded onto mobile devices 130. For example, a heartbeat signal may be transmitted to communicate a timing reference indicating which scene a mobile device 130 should be playing and when to start the scene. Whether the lightshow commands are dynamically transmitted or preloaded onto the mobile devices 130, the heartbeat signals could also convey node locations and venue size. The venue configuration signals (e.g. which may be conveyed as data packets 180C seen in FIG. 5C) communicate the locations of speaker nodes 126 to pixels 102 to assist the pixels 102 in determining their own locations. In other embodiments, tone IDs may be conveyed in the venue configuration signals, and/or speaker node locations may be conveyed in the heartbeat signal.

Another type of signal that may be broadcast by beacon transmitter 122 is a locate pixel message. This signals the pixel 102 to go into record mode, listen for and record the distinct positioning audio sounds (tones, beeps, chirps or the like) emitted by a plurality of speaker nodes 126, and determine a location of the pixel 102 based on the TDOA of the recorded audio sounds. The locate pixel message may include information communicating which audio sound is expected to come from which speaker node 126. Alternately or in addition, such information may be transmitted with venue configuration signals or other signals.

Other types of signals that may be broadcast by beacon transmitter 122 include signals that cause the mobile devices 130 (functioning as pixels 102) to display specific images, words, phrases or text/alphanumeric messages on each mobile device 130's display screen 131. These types of signals may have applications for dynamically communicating information to event attendees about the live event.

For example, at a live sporting event, when a team scores, the scoring team logo or team color(s) may be displayed on pixel display screens 131. Other information that may be displayed on the display screens 131 includes the number and/or name of the player who scored, the current score for the teams, time remaining in the period or the like, penalty information, game statistics, and the like. In some embodiments, advertisements and/or event sponsorship media may be displayed on pixel display screens 131. In some embodiments, public safety messages may be displayed on pixel display screens 131. For example, public safety messages may include messages containing information regarding an emergency, safety threats, locations of emergency exits, emergency procedures, evacuation procedures, lockdown procedures and the like. Beacon signals may also be generated and broadcast to the mobile devices 130 to cause sound effects, music, audible voice, and/or the like to be played on the mobile device 130.

Signals that are broadcast by beacon transmitter 122 are under the control of lightshow controller 124. In particular embodiments, lightshow controller 124 is configured to run a master controller application that provides a Graphical User Interface (GUI) 123 for the operator to input commands to facilitate control over the pixels 102 via beacon transmitter 122. (The master controller application and GUI 123 may also be used to control the positioning signal transmitter 125 and speaker nodes 126, as described in further detail herein.) An operator of lightshow controller 124 can use GUI 123 to set up the scenes for the lightshow and can edit upcoming scenes while the lightshow is in progress. In addition, the operator of lightshow controller 124 can use GUI 123 to transmit particular commands to the pixels 102 via beacon transmitter 122 to start/stop play scene to the end of the phrase and stop, turn all pixels off, vibrate mobile device, activate LED flash, etc. The operator can also use GUI 123 to control other types of signals sent by beacon transmitter 122 to pixels 102 including for example heartbeat signals, venue configuration signals, locate pixel packet, and the signals commanding the display of specific words, phrases or messages on a pixel's display screen. The GUI 123 may also be used to adjust the parameters for transmission of batches of beacon signals. Software for the master controller application can be stored in program memory that is part of or accessible to lightshow controller 124. Execution of the software instructions stored in the program memory causes the lightshow controller 124 to accept various inputs from the operator via GUI 123 and direct the encoding and transmission of particular signals by beacon transmitter.

Figure 3B:
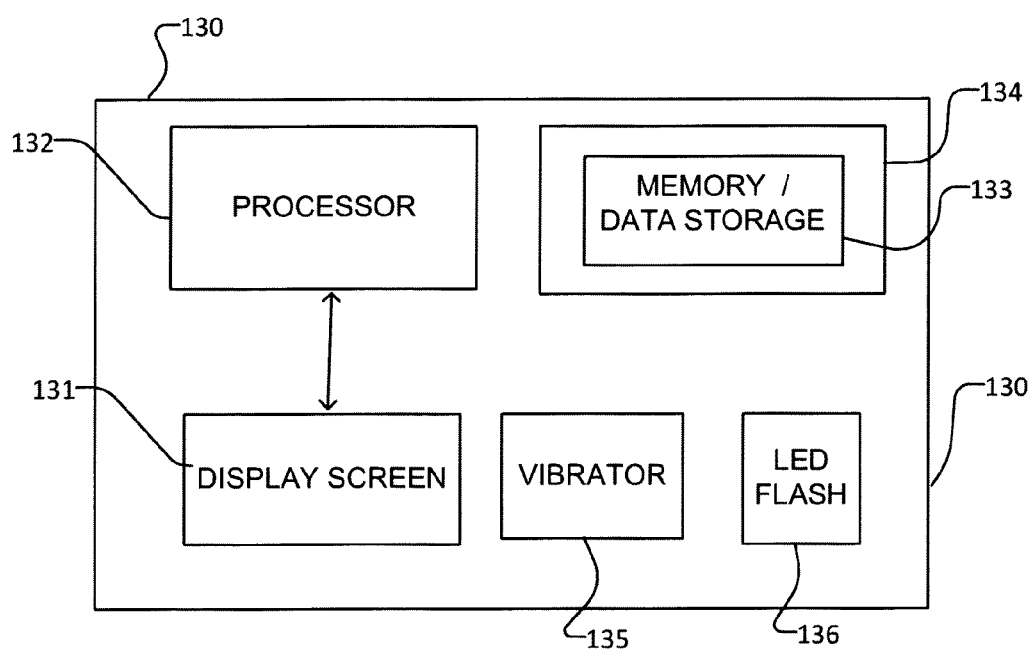
FIG. 3B schematically illustrates the hardware and/or software components of the FIG. 3A mobile device.

As seen in FIG. 3B, mobile device 130 serving as a pixel 102 comprises a processor 132 that executes software instructions 133 loaded in memory or computer data storage 134 incorporated in the mobile device 130. Memory storage 134 may comprise RAM (Random Access Memory), for example. The software instructions 133 that are loaded in memory storage 134 may be, for example, provided in a mobile application that is downloaded to the mobile device 130 prior to the lightshow. Alternately, the software instructions 133 may be stored in a memory elsewhere that is accessible to the processor 132 or made available to the processor 132 over a suitable wireless or wired connection (e.g. a mobile web application). Execution of the software instructions 133 causes the mobile device 130 to:
  perform the steps of scanning for and decoding the beacon signals broadcast by beacon transmitter 122;
  distinguish between different types of messages such as a lightshow command signal, heartbeat signal, venue configuration signal and locate pixel signal, each encoded with different pieces of information; and
  perform specific actions in response to the decoded information.

In particular embodiments, the lightshow may be created by scene, wherein each scene comprises a particular sequence of actions to be performed by the pixels 102. A lightshow comprises a series of scenes played sequentially. Thus, a particular type of lightshow command encoded in a beacon signal may be a "play scene" command, containing various scene parameters that tell the mobile device 130 to turn on/off its display screen 131 and/or display a particular color on the screen 131. Lightshow controller 124 may be controlled by an operator to generate such play scene commands through a graphical user interface (GUI) 123 to a master controller application. Using the GUI 123, an operator can, among other functions, set the parameters for a scene prior to the start of a lightshow and save them to a scene playlist, and set or edit the parameters for an upcoming scene in the course of a lightshow, i.e. once the lightshow has commenced.

Figure 8A:
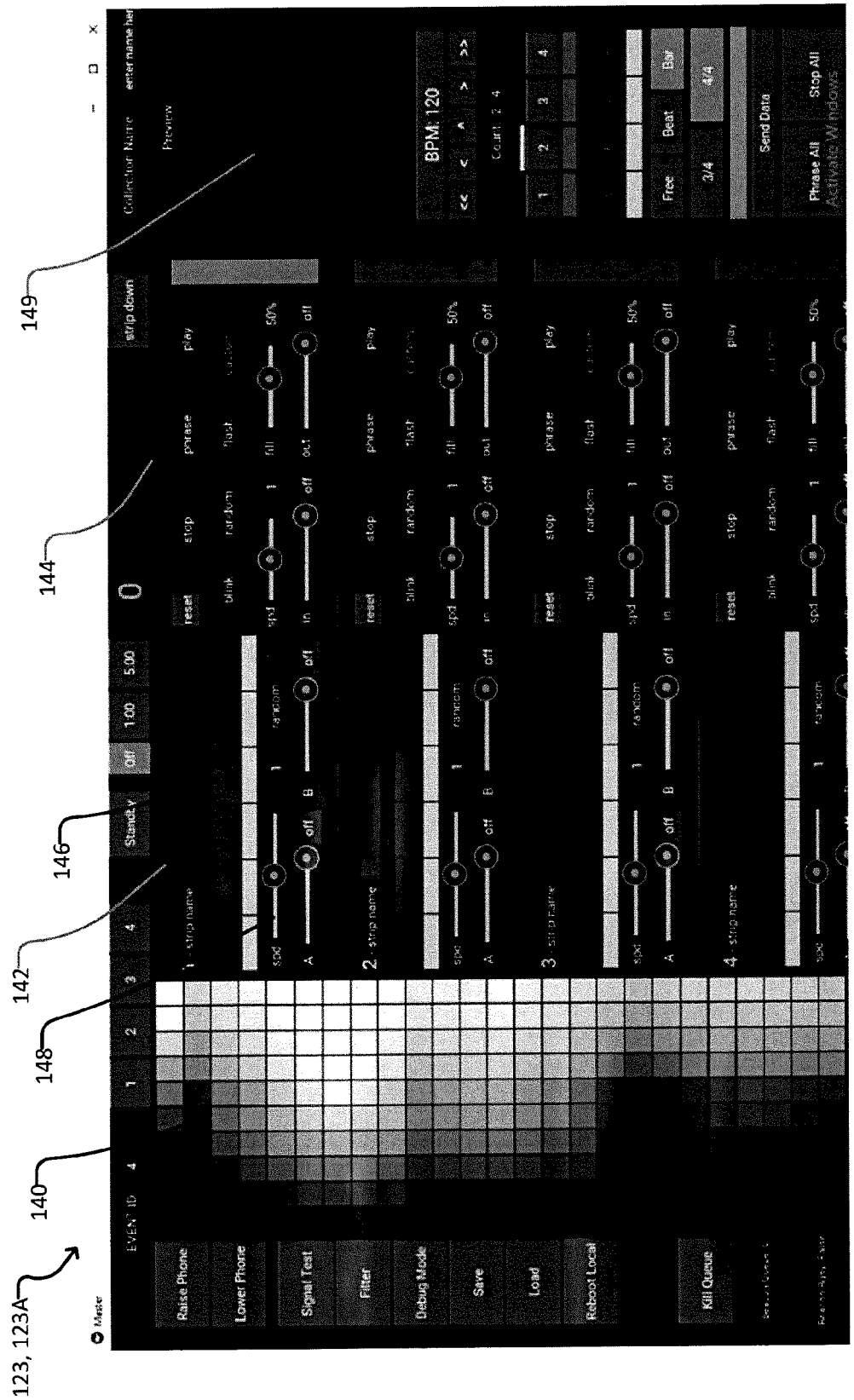
FIGS. 8A, 8B and 8C are screen shots of a graphical user interface that may be used to control a lightshow controller in accordance with one embodiment.
Figure 8B:
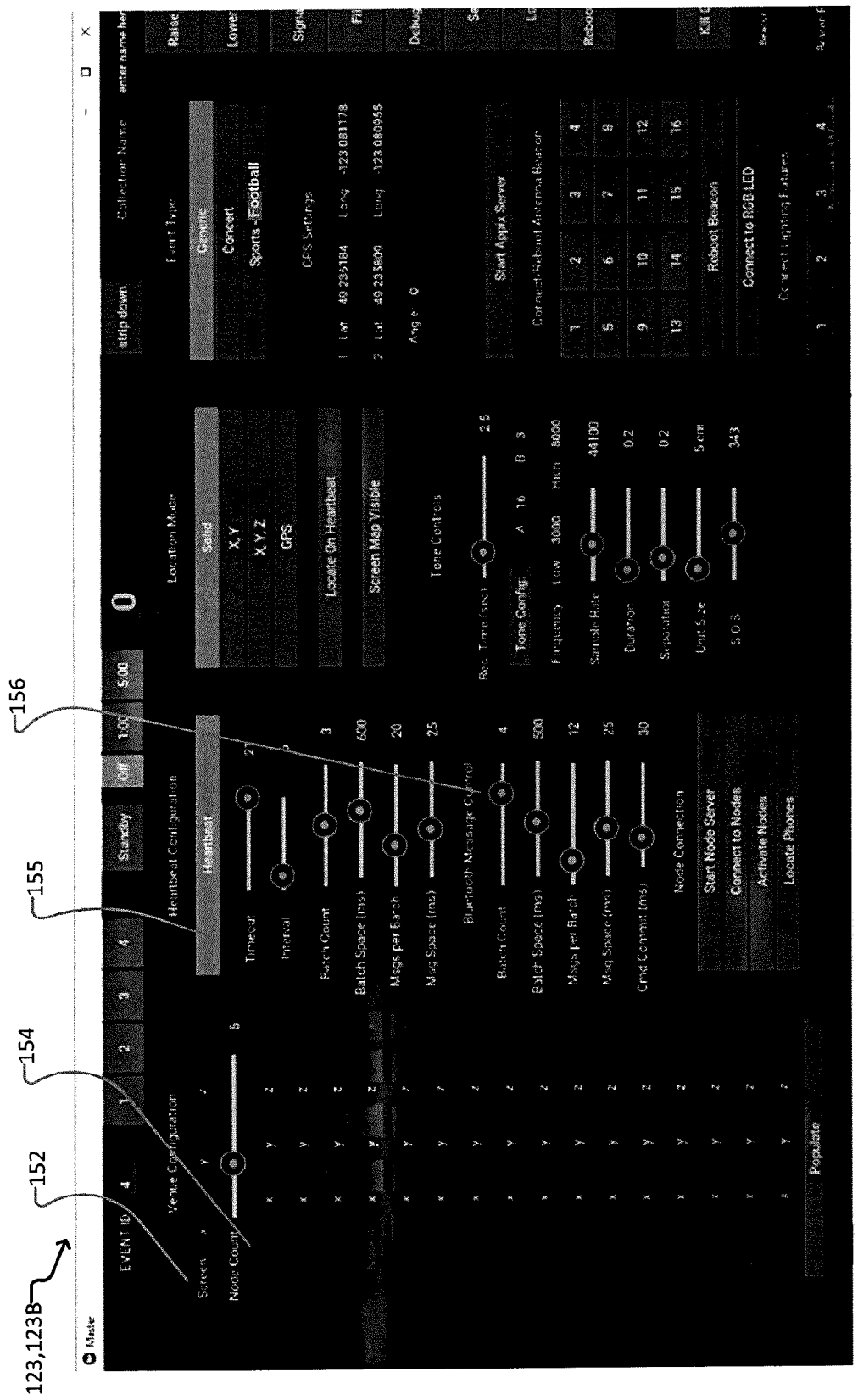
Figure 8C:
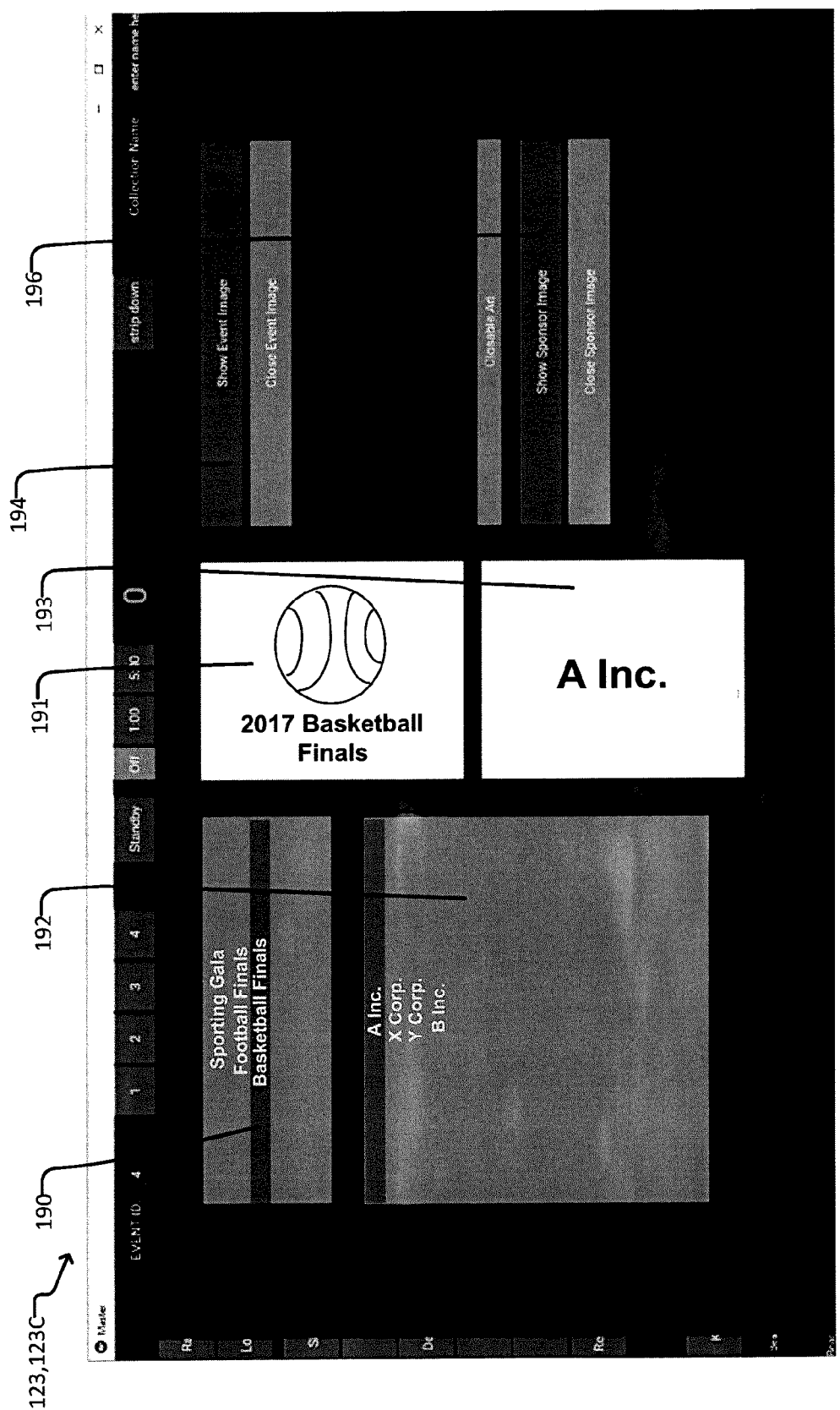

Exemplary screen representations for GUIs 123A, 123B and 123C (individually and collectively GUI 123) for a master controller application running on lightshow controller 124 are shown in FIGS. 8A, 8B and 8C. As seen in FIG. 8A, GUI 123 comprises a color palette 140 from which the operator can select colors to be displayed during a scene. GUI 123 also comprises two or more control layers for setting the scene parameters for a play scene command. In particular, GUI 123A comprises a first image control layer 142 which determines the sequence of colors 146 and gradient transitions 148 between colors for a scene, and over how many bars of music (measures) the color sequence loops (i.e. the speed of the color sequence). GUI 123A also comprises a second image control layer 144 which determines the blinking of the display screen (e.g. speed of blink, such as determined by the portion of a bar over which a blink occurs, time that the display is ON and time that the display is OFF, fill in/out, and the like).

Each scene may be configured using parameters set in image control layers 142 and 144. Image control layers 142 and 144 may be combined or juxtaposed when playing the scene on a mobile device 130. For example, if the first image control layer 142 is set to loop through displaying the colors red, blue and yellow over the course of a scene, and the second image control layer 144 is set to blink in a particular pattern over the course of the scene, then for a play scene command comprising the combination of image control layers 142, 144, the display screen 131 of mobile device 130 will display the colors (red, blue or yellow) as specified by first layer 142 but those colors will only be visible (i.e. the screen will only be displaying those colors) during the periods of the time when the blink is "ON" as specified by second layer 144.

Thus, the scene parameters for a "play scene" command that are encoded into the lightshow command signal may comprise the following parameters or a subset thereof:
  unique software ID;
  current show ID;
  unique message ID;
  message type;
  play type (straight, random gradient, random blink, random gradient and random blink);
  a set of color IDs (e.g. color ID 1, 2, 3, 4, 5, 6, etc.) identifying the colors to be played over the scene in sequential or random order;

gradient speed (e.g. expressed in bars—the number of bars the particular sequence of colors in the scene should loop over);

gradient transitions (e.g. a transition into a particular color and a transition out of the color, expressed as percentages);

blink speed;

blink fill;

blink in and out (determines fade in/out for a particular blink, expressed as a percentage);

scene number;

beats per minute (bpm);

phrase flag (ON/OFF) (if the phrase flag is "ON" then the mobile device 130 plays to the end of a phrase (e.g. a scene or sequence of scenes) and stops; otherwise the mobile device 130 loops continually through the scene (s));

and/or the like.

FIG. 5B shows an example structure for a data packet 180B for a lightshow command message according to a particular embodiment. As with all data packets 180 transmitted by beacon transmitter 122, the data packet 180B commences with a 1-byte preamble 181 for protocol management, followed by a 4-byte access address 182. After the access address 182, data packet 180B contains a packet data unit (PDU) 183. The data packet 180B concludes with a cyclic redundancy check (CRC) 184 for error checking. As seen in FIG. 5B, the PDU 183 contains a 2-byte header 185 and a variable payload 187' (e.g. 6 to 37 bytes in length) which has the contents of the lightshow command message. The length of the payload can be defined in the header 185. The payload 187' comprises a plurality of fields 187 each of which is designated for a different portion of the message. The illustrated representative fields 187 comprise a message type 187A (e.g. identifying that the message is a "play scene" command, or some other type of lightshow command as described herein), play type 187B (e.g. identifying the type of scene that is being played if the message type is a "play scene" command), a set of color IDs 187C defining the colors played over the scene, a gradient speed 187D (speed at which the screen transitions to the next color), and a Beats Per Minute (bpm) 187E. Not all of the fields 187 that can be defined in a payload 187' for a lightshow command message are necessarily illustrated in FIG. 5B. Other fields 187 (not shown) that are needed to provide a lightshow command message may be defined in the payload 187'.

A third image control layer 149 may be provided by way of GUI 123A (see FIG. 8A). Image control layer 149 contains a representation of a birds' eye preview of the venue, representing what the overall display 103 should look like for each particular frame, upon transmission of the lightshow command signal to the pixels 102. The third image control layer can be used to select and show an image representation of a scene type, wherein each scene type identifies a particular predetermined scene of moving lines, spirals, swirls, halos and/or other effects, or any other animation or image. Device 130 may look up the scene type from a library of scene types stored on each mobile device 130 or made accessible to the mobile device 130 over a wireless or wired connection (e.g. Internet or WiFi wireless connections). By combining image control layers 142, 144 and 149 and knowing its position in the venue 100, and thereby locating its position within the display 103 as represented by image control layer 149, each pixel 102 can determine what it should display in order to contribute to the animation or image displayed by display 103. Apparatus and methods for pixel location determination according to particular embodiments are described further below.

In some embodiments, one or more of image control layers 142, 144 and 149 are omitted, disabled or configured in a default configuration setting. For example, image control layer 149 may be disabled or in the absence of any input for the layer, it may default to a "display all" mode (meaning that each pixel 102 regardless of its location is displaying the same image as all of the other pixels 102 as provided by image control layers 142 and 144; in other words the mobile devices 130 are all playing the same scene on their display screens 131; in this mode, image control layer 149 has no effect).

Another type of signal that may be broadcast periodically by beacon transmitter 122 is a heartbeat signal. A heartbeat signal may be broadcast once every 5 to 15 seconds in some embodiments. The heartbeat signal carries information to enable pixels 102 to be in synchronization with the lightshow music beats and to start playing a scene at the correct time. The parameters that are encoded into the heartbeat signal may comprise the following parameters or a subset thereof:

unique software ID;

current show ID;

unique message ID;

message type;

beats per minute (bpm);

heartbeats since last bpm reset;

beat mode type;

time signature;

time since beat one (e.g. expressed in number of milliseconds);

speed of sound (the speed of sound is a parameter which may vary based on the temperature in the venue and the height of the venue above mean sea level (AMSL); therefore the speed of sound for the lightshow at a particular venue may be determined for a given room temperature and AMSL and communicated to the pixel to enable accurate determination of its location; in some embodiments the speed of sound may be transmitted as part of the heartbeat signal while in other embodiments the speed of sound may be transmitted as part of another type of message, such as a venue configuration message or a locate pixel message);

and/or the like.

Upon decoding the heartbeat signal to ascertain the time since beat one and the bpm, a pixel 102 can determine when to start playing the next scene, once the current scene comes to an end.

FIG. 5A shows an example structure for a data packet 180A for a heartbeat message according to a particular embodiment. Data packet structure 180A has a similar overall structure to data packet structure 180B (FIG. 5B), but has a different format for its variable-length payload 186'. As seen in FIG. 5A, the payload 186' comprises, for example, a message type 186A (e.g. identifying that the message is a heartbeat), Beats Per Minute (BPM) 186B, beat mode type 186C (which specifies when and how to play a scene), time signature 186D (e.g. 2/4 3/4, 4/4 time), time since beat one 186E (which can act as a timing reference point), and speed of sound 186F (which can be set according to the particular venue). Other fields 186 (not shown) that are needed to provide a heartbeat message may also be defined in the payload 186'. In some embodiments, beat mode type 186C can be "free mode" whereby the pixel 102 plays the scene as soon as it receives the data packet 180A, "beat mode" whereby the pixel 102 plays, phrases, or stops a scene at the end of the bar (e.g. at the end of 4 beats if the time signature 186D is 4/4 time), and "bar mode" whereby the pixel 102 plays, phrases or stops the scene at the end of the active bar count total. In addition to or in the alternative to the foregoing, a time mode parameter can be defined, wherein in time mode the lightshow operator can control the pixels 102 based on time durations as defined in seconds, rather than beats and bars. For example, the pixels 102 may be controlled to play a scene for a certain number of seconds as specified by the lightshow operator using the master controller application.

In addition to facilitating synchronization of the pixels 102 (to ensure for example that they start playing a scene at the same time), the heartbeat signal can also be used to monitor a pixel's responsiveness. Occasionally, the Bluetooth receiver on a mobile device 130 may hang or freeze. For example, some Android devices have Bluetooth hardware that can become unresponsive after a number of Bluetooth signals are sent to it. Mobile device 130 can be configured such that after the elapse of a period of time, i.e. a heartbeat timeout period (such as 12 seconds) without having received a heartbeat signal at a mobile device 130, the mobile device 130 is caused to stop the display of the scene that it is currently displaying, clear the display screen on the pixel and/or display a blank screen, restart the Bluetooth hardware, and/or restart Bluetooth scanning.

A further type of signal that may be broadcast periodically by beacon transmitter 122 is a venue configuration signal. A venue configuration signal may be broadcast once every 10 to 20 seconds, for example. The venue configuration signal is encoded with the locations of speaker nodes 126. The speaker node locations can be entered into node location fields 154 on GUI 123B (see FIG. 8B). By knowing the node locations, and receiving audio signals from the nodes, a pixel 102 can be configured to calculate its position, as described in further detail below. Other information that can be encoded in the venue configuration signal includes an origin offset allowing for a translation from a display 103 frame of reference to another (e.g. such as one based on the center of a speaker node cluster), and tone information or tone IDs 188D identifying the frequency or other characteristics of the audio signal generated by each speaker node 126. Such other information can also be used by the pixels 102 to determine their locations. In some embodiments, some of the information listed above (e.g. tone IDs 188D) may be transmitted in a heartbeat signal, in addition to, or in the alternative to, transmitting it in a venue configuration signal.

FIG. 5C shows an example structure for a data packet 180C for a venue configuration message according to a particular embodiment. Data packet structure 180C has a similar overall structure to data packet structures 180A (FIG. 5A) and 180B (FIG. 5B), but has a different format for its variable-length payload 188'. As seen in FIG. 5C, the payload 188' comprises, for example, a message type 188A (e.g. identifying that the message is a venue configuration message), origin offset 188B, set of node locations 188C and tone IDs 188D (identifying tone characteristic) for each node. Other fields 188 (not shown) that are needed to provide a heartbeat message may also be defined in the payload 188'.

Individual images may be displayed during an event on each of the pixel display screens (e.g. the display screens of mobile devices 130). As illustrated by FIG. 8C, an image corresponding to a live event to be displayed on a mobile device 130 may be selected using live event selection field 190 of GUI 123C. An advertisement or sponsorship image to be displayed on mobile device 130 may be selected using live event selection field 192 of GUI 123C. A preview of an event image or advertisement or sponsorship image is shown in preview fields 191 and 193 respectively. An event image may be sent to be displayed on mobile device 130 by clicking on button 194 of GUI 123C. An advertisement or sponsorship image may be sent to be displayed on mobile device 130 by clicking on button 196 of GUI 123C.

As previously noted, the beacon communication protocol used for the data packets 180 may be Eddystone protocol. Eddystone protocol allows for encoding of data in a customized format to communicate with mobile devices running on either iOS or Android mobile operating systems. Because Eddystone can be used for communicating with either iOS or Android devices, only one set of signals need to be broadcast by beacon transmitter 122, thereby alleviating timing or data communication issues that might arise from sending multiple sets of signals encoded in different signal formats for different types of devices. In other embodiments, data packets 180 may be in accordance with other suitable communication protocols.

There are certain challenges involved with manipulating BLE beacon signals to cause a receiving mobile device 130 to perform certain actions. For example, not all individual BLE beacon signals are generally received by a mobile device 130. This is due at least in part to the fact that Bluetooth signals are generally transmitted for a shorter time than the scan rate of a mobile device 130 such as a smartphone. To address these problems, redundancy can be provided by sending the beacon signal in batches, wherein each batch comprises a plurality of copies of the same message (in the form of repeated BLE data packets all transmitting, for example, the same "play scene" command or other command). Each data packet within a batch is separated by a certain time period. For example, in some embodiments, the same message is sent 15-25 times (i.e. 15-25 copies per batch), separated by 20 ms each. FIG. 4 illustrates a first batch 150A and a second batch 150B of repeated data packets. In some embodiments, there are 15 data packets 153 per batch. The time $t_m$ between successive data packets 153 may be 25 ms, for example. The time $t_b$ between the start of batch 150A and the start of the next batch 150B may be 500 ms, for example (i.e. batches 150 are sent every 500 ms). The number of data packets 153 per batch 150, and the time between transmission of successive data packets 153 and between successive batches 150 may vary for different configurations of beacon transmitter 122 or lightshow control system 104. The specific data packet transmission parameters including time $t_b$ between batch transmissions (or frequency of batch transmission), number of batch transmissions for each message, number of data packets per batch, time $t_m$ between successive data packets within a batch, etc., can be configured using a beacon message transmission control panel 156 on GUI 123B of FIG. 8B. By sending multiple copies of the same message in batches, the chances of a mobile device 130 picking up each command are increased substantially over sending each message only once. In some embodiments, the number of data packets per batch and time $t_m$ between successive copies of a message is configured such that the receive rate for the mobile devices 130 is 95% or higher.

Unlike the use of audio signals, where pixels 102 might receive the same audio signal communication at different times due to their varying distances from a transmitter, any synchronization issues resulting from the travel time for BLE signal communication are generally negligible due to the BLE signals travelling at the speed of light. Other sources of synchronization issues (other than those that may be caused by a delay in transmission due to the speed of the signal) are more likely to be significant. For example, these sources of delay may be related to the hardware or firmware constraints or data processing constraints of mobile devices 130 or variations in beacon signal receiving/processing capabilities between different mobile devices 130. Some methods for addressing these issues are described in further detail herein.

One timing issue is that where repeat data packets are sent in batches as described above for redundancy purposes, the timing reference information in a heartbeat signal is no longer accurate for all instances of the data packets since the data packets are sent at slightly different times within a batch. In addition, response time may vary between different mobile devices, such as for example, between different models of smartphones, which may lead to synchronization issues when playing a lightshow across different mobile devices receiving and responding to data packets at slightly different times. To address these problems, the timing reference information (e.g. time since beat one) is incremented for each packet within the same batch, to ensure that the packet that is received by the mobile device 130 contains timing information that is precisely synchronized with beat one. For example, assuming that successive data packets within a batch are separated by $t_m$=25 ms, and the timing reference for the first data packet is $t_R$, then the timing references for the subsequent data packets in the batch are $t_R$+25 ms, $t_R$+50 ms, $t_R$+75 ms, and so on. Such granular timing reference information sent with the heartbeat signal enables more precise synchronization of the mobile devices 130.

A further issue with the use of BLE beacon signals arises from the fact that BLE beacon data packets originating from a beacon device are typically configured to have the same MAC address. On certain mobile devices, once a mobile device 130 has received a data packet from one beacon transmitter, it may ignore subsequent data packets from that same beacon transmitter due to the mobile device 130 recognizing the same MAC address being in the subsequent data packets. To ensure that the mobile device 130 does not ignore subsequent blasts of a BLE beacon signal which contain new information, in particular embodiments the beacon transmitter 122 is configured by the GUI 123 of the master controller application to update the MAC address on the transmitter and encodes on the signal a new MAC address for each batch group of packets conveying a new message, thereby causing the receiving mobile device 130's operating system to interpret the batches as originating from a new beacon device. This causes mobile device 130 to read each subsequent blast of signals. The updating of the MAC address on the transmitter 122 may be achieved by way of custom firmware installed on the beacon transmitter 122, or other suitable means.

Where the operating system for a mobile device 130 does not provide access to the MAC address on beacons (e.g. as is the case with at least some iOS devices), mobile device 130 may be effectively precluded from recognizing or distinguishing a command from a previous command if both commands are the same, since the mobile device 130 will be unable to read the MAC address (although it may recognize the fact that there is a new MAC address). This may occur in cases where the lightshow operator wants to phrase or show the same scene two times, and therefore sends the same lightshow command twice. In order to facilitate recognition of both commands and prevent mobile device 130 from ignoring the subsequent identical command (which can put the iOS mobile devices 130 out of sync with the Android mobile devices 130), each message is encoded with a unique identification number. This identification number may be included, for example, in the data packet payload. In this way, mobile devices 130 which have a tendency to ignore a subsequent command because it is unable to read the MAC address from a beacon signal, are made to recognize the subsequent command as being different from the previous command, due to the different identification numbers transmitted with the commands.

Figure 6:
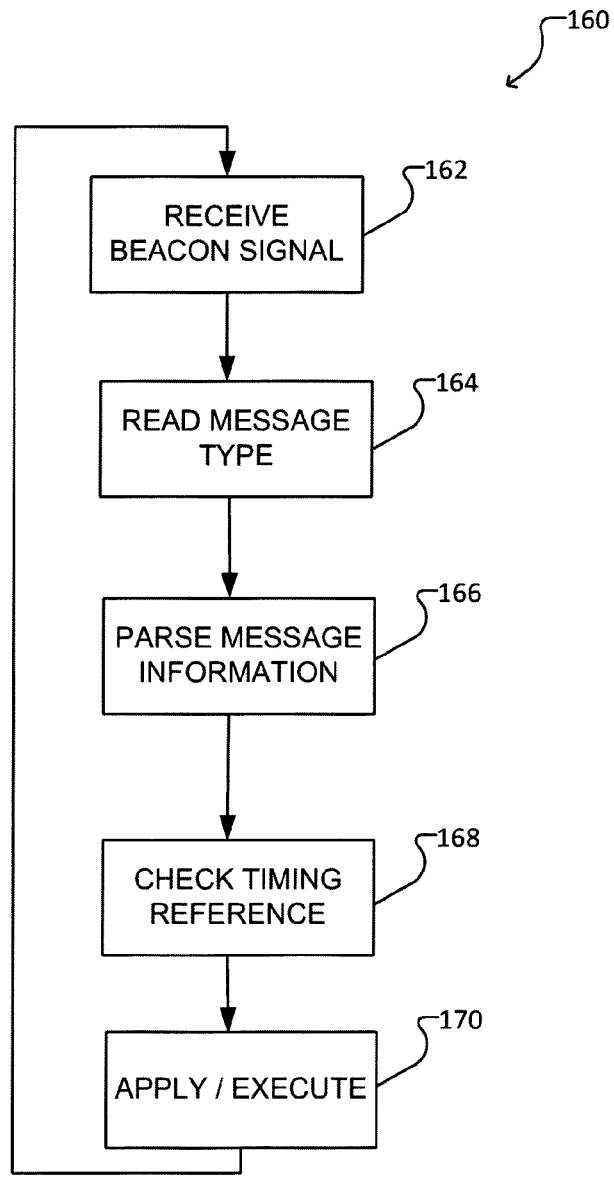
FIG. 6 illustrates a method for decoding a beacon signal and producing a lightshow on a mobile device, in accordance with one embodiment.

FIG. 6 illustrates a method 160 for decoding a beacon signal and producing a lightshow on a mobile device, in accordance with one embodiment. Method 160 may be implemented by a mobile device 130 executing software instructions. The software instructions are loaded from memory or data storage on the mobile device 130 or otherwise made available to mobile device 130 over a wireless or wired connection (e.g. a web mobile application). The software instructions that are loaded in memory may be provided, for example in a mobile application that is downloaded to the mobile device 130 prior to the lightshow. The steps of method 160 may be performed each time a new batch of beacon messages is detected by a mobile device 130. For example, method 160 may be performed every 20-30 ms in some embodiments which comprises the time between successive batches 150 of packets 153 (see FIG. 4). Each mobile device 130 is controlled by lightshow commands that can be generated by an operator of lightshow controller 124 in the course of a lightshow. Method 160 facilitates dynamic or real time updating of lightshow scene parameters through the GUI 123 interfacing to the master controller application running on the lightshow controller 124, since each mobile device 130 receives and decodes the lightshow commands shortly before each scene and based on such commands, determines what actions it needs to perform in order to display the scene.

Method 160 begins at block 162 with scanning for and receiving a signal from a beacon transmitter 122. When a beacon signal is detected, the method proceeds to block 164 by decoding at the mobile device 130 the message type from the received data packet (e.g. such as lightshow command; heartbeat; venue configuration signals; and locate pixel). Other data may be decoded from the data packet to enable parsing and interpretation of the contents of the data packet. At block 166, the remainder of the contents of the data packet payload is decoded based on at least the message type. The contents of the data packet payload provide directions to the mobile device 130 to perform particular actions as described herein. For example, if the message type is a lightshow command, then the decoded contents may comprise specific lightshow command parameters for a "play scene" command (such as color IDs, gradient speed, etc.) which control what is played on the display screen 131 of mobile device 130 for each scene of the lightshow.

At block 168, the method 160 proceeds by checking if a heartbeat signal has been received within a period of time equivalent to the heartbeat time-out period. The heartbeat signal contains timing reference information as discussed herein. If no heartbeat signal has been received in the time-out period, then mobile device 130 is directed to perform a specific action such as: stopping the display of the scene that it is currently displaying, clearing of the display screen on the mobile device and causing the device to display a blank screen, and/or restarting scanning for a beacon signal. The check performed at block 168 may be performed only once for every heartbeat time-out period (i.e. method 160 skips to the next step 170 if the heartbeat time-out period has not lapsed). In some embodiments the step at block 168 is omitted. In other embodiments the step at block 168 is optional and an operator of lightshow controller 124 can choose to disable the transmission of heartbeat signals. For example, the operator can use GUI 123B (FIG. 8B) to select the "enable heartbeat" bar 155 to enable/disable the broadcast of heartbeat signals. To disable heartbeat signals, a signal communication can be sent to mobile devices 130 so as to control such devices to cease responding to the absence of heartbeat signals within a heartbeat time-out period (e.g. their display screens 131 will not automatically clear or their Bluetooth hardware will not be rebooted upon the lack of receipt of a heartbeat signal, etc.). To re-enable heartbeat signals, a signal communication can be sent to mobile devices 130 that will cause them to look for a heartbeat signal and to respond accordingly if they do not receive one within a heartbeat timeout period.

Method 160 then proceeds to block 170 where the parameters or commands decoded at block 166 are applied or executed to display the lightshow. Certain message types (e.g. locate pixel and venue configuration) cause the mobile device 130 to determine information (such as the mobile device or pixel location and the location of speaker nodes 126). Other message types (e.g. lightshow command) may cause the mobile device 130 to apply the determined pixel location and speaker node locations and based on the lightshow parameters, play a scene on the display screen 131 of mobile device 130. The lightshow display actions performed by mobile device 130 at block 170 can be synchronized with those of other mobile devices 130 using the heartbeat signal which provides a timing reference point. In some embodiments, each mobile device 130 queues the actions and waits until the next scene and precisely at the right time (based on the timing reference information) before displaying the lightshow. In particular embodiments, the timing precision is such that each mobile device 130 is synchronized to within ±5 milliseconds of the heartbeat timing reference point.

Another potential synchronization problem is that visual objects in the code take time to compile and store in memory or data storage when the appropriate signal arrives at a mobile device 130. Since there is a delay in response of the mobile device 130 while it is creating the visual object for a scene, in some cases this leads to a lightshow effect that is out of sync even when the heartbeat code is used to synchronize mobile devices 130 for a lightshow. To address this problem, processor 132 of mobile device 130 can be configured so that when a mobile device 130 receives a lightshow command signal such as a play scene command, it compiles the visual object from code in order to pre-generate the effect and stores the visual object file in memory (such as RAM) or non-volatile data storage (such as flash memory) in advance of the beat at which the scene is to be played. When the appropriate beat arrives (which is determined with respect to timing reference information provided in the heartbeat signal), processor 132 of mobile device 130 instantly calls and executes the pre-generated visual object to start playing the scene, thus avoiding or minimizing delay in response time of the mobile device 130 which could otherwise occur if the processor 132 had to generate the visual object for the scene without sufficient advance time. To ensure space in memory for further visual objects, visual objects may be deleted once they are used/called in order to play a scene and are no longer needed.

In some embodiments, the display of a lightshow on mobile devices 130 is facilitated by a mobile application running on the mobile device 130 which makes use of flash hardware functionality to turn on/off a camera flash or other light source on the mobile device, to generate visual effects for the lightshow. This flash functionality may be in addition to operation of the mobile devices 130 in "color mode", i.e. the display of color on display screens 131 of the mobile devices 130 to play scenes of a lightshow as described above. Some mobile devices 130, particularly Android smartphones, may heat up when engaging flash hardware. In order to mitigate these effects, the mobile application may be programmed to cause the mobile device 130 to engage the flash hardware only when the mobile device 130 is running in "flash mode" to alleviate the need to have the hardware engaged and ready for use the entire time. The flash hardware can be disabled when the mobile device 130 is operating in "color mode" only without also operating in the flash mode.

Figure 7:
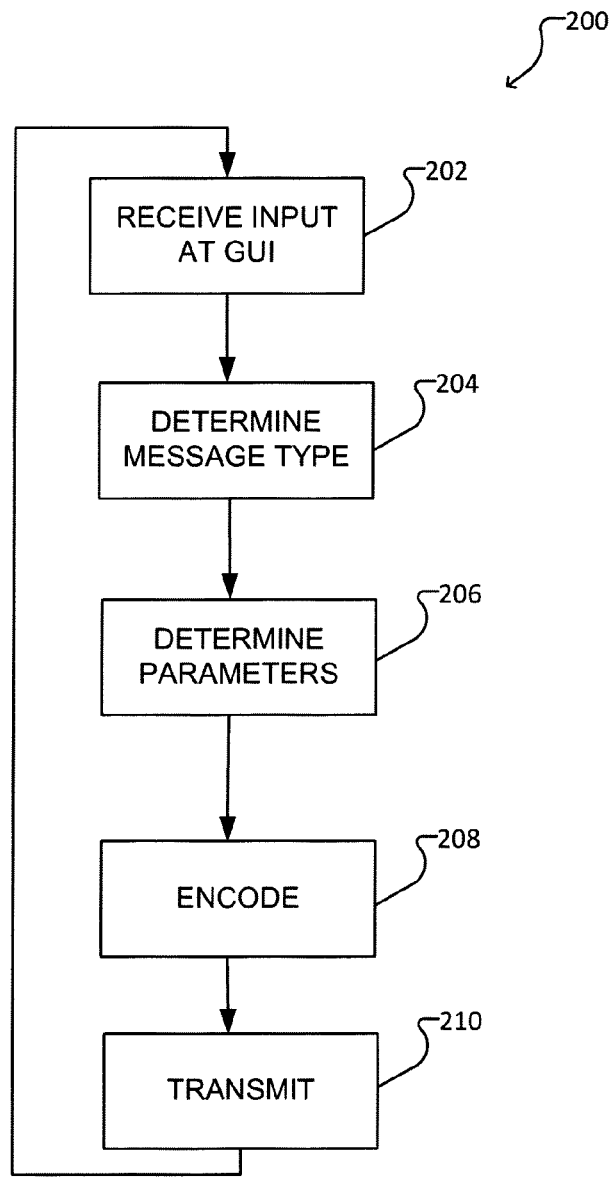
FIG. 7 illustrates a method for receiving input parameters at a lightshow controller and encoding beacon signals based on the parameters.

FIG. 7 illustrates a method 200 for determining scene parameters and encoding beacon signals with the scene parameters. The encoded beacon signals that are generated and broadcast as a result of performing method 200 can be received by a mobile device 130 and decoded using method 160 of FIG. 6 in order to produce commands for a mobile device 130 for displaying a lightshow. As with method 160 of FIG. 6, method 200 of FIG. 7 facilitates dynamic or real time updating of lightshow scene parameters through the GUI 123 interfacing to a master controller application running on the lightshow controller 124. Method 200 begins at block 202 by receiving inputs from an operator of lightshow controller 124 at GUI 123. The inputs may correspond to scene parameters and other parameters to define and set up a lightshow such as venue-specific parameters and heartbeat signal parameters. Method 200 proceeds to blocks 204 and 206 where the contents of a beacon data packet are determined based on the inputs received at block 123. These steps may include, for example, identifying message type, and identifying the specific parameters for the message type. For example, if the message type decoded at block 204 is a lightshow "play scene" command, then at block 206 method 200 proceeds by identifying play type (straight, random gradient, random blink, random gradient and random blink); a set of color IDs for the colors to be played over the scene; gradient speed; gradient transition, etc. based on inputs received at block 202. The parameters are then encoded by beacon transmitter 122 onto BLE signals at block 208. The encoded signals are broadcast by the beacon transmitter 122 at block 210.

While apparatus and methods for producing a lightshow display across multiple pixels 102 are described above with reference to the use of BLE signals broadcast from beacon transmitters 122 and received by mobile devices 130, in other embodiments other types of wireless signals may be used to control the pixel devices in accordance with similar methods to those described above (e.g. by transmission of different types of messages such as lightshow commands, venue configuration and locate pixel). For example, WiFi signals, audio signals, regular or classic Bluetooth signals (as opposed to low energy Bluetooth) and the like, could be used to relay one or more messages to mobile devices 130 to generate a lightshow. Where the devices that are used as pixels 102 comprise RF receivers or IR receivers, then RF transmitters or IR transmitters (as the case may be) can be used to relay the lightshow communications (as RF or IR signals) to the devices in accordance with the methods described herein.

Figure 9:
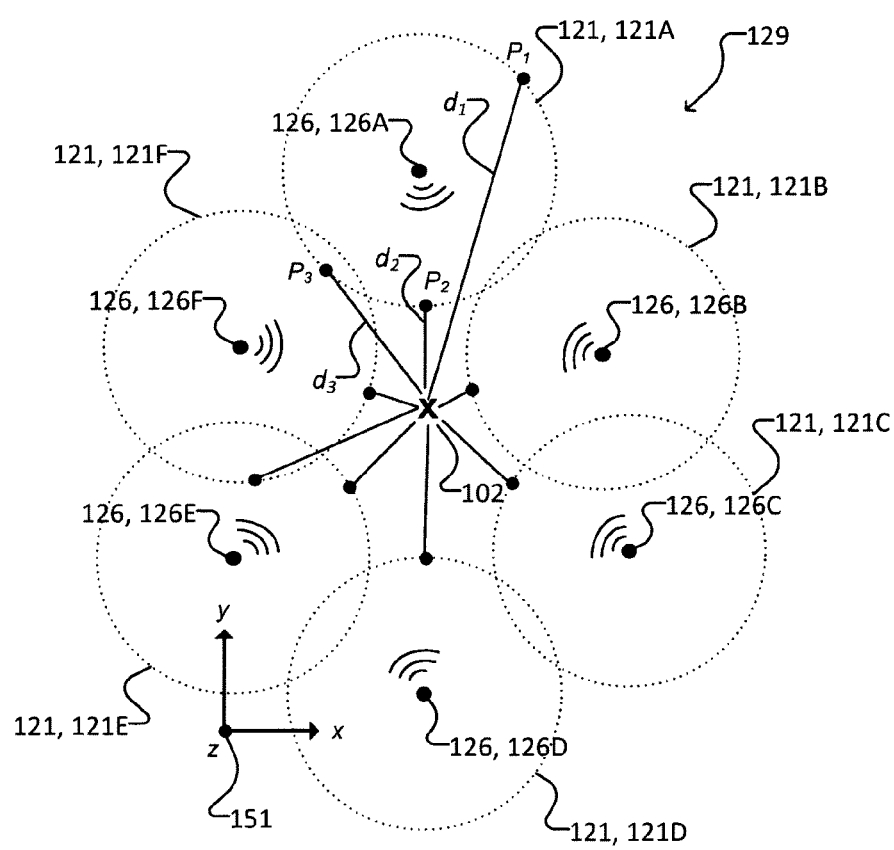
FIG. 9 schematically illustrates a top plan view of a speaker node cluster according to an embodiment for determining a location of a pixel using trilateration and/or multilateration methods.

Apparatus for enabling the determination of locations of pixels 102 is shown in FIG. 2. Lightshow control system 124 includes a positioning signal transmitter 125, which controls a plurality of speaker nodes 126. Each speaker node 126 comprises a receiver 127, a tone generator 128, an amplifier 118, and an omnidirectional speaker array 119. In some embodiments, there are four speaker nodes 126. In still other embodiments, there are six speaker nodes 126, as shown in FIG. 9 for example. Certain embodiments of lightshow control system 124 employ up to 16 speaker nodes 126. Positioning signal transmitter 125 conveys a signal to each of the receivers 127, which in turn controls the tone generator 128 to generate an electrical signal for a tone which is provided to the audio amplifier 118. The output of the audio amplifier 118 is used to drive the speaker array 119 to produce a sound or audio signal unique to the speaker node 126, so that each speaker node 126 can be identified by its audio signal. For example, optical fiber, RF, WiFi or Ethernet connections and the like, could be used to convey the signal from the positioning signal transmitter 125 to each of the receivers 127. The audio signal that is emitted by speaker node 126 may be a periodic tone. The tone generator 128 for each node 126 generates a different predetermined tone or other audio signal (such as a chirp upward or downward). In particular embodiments, the tones are in the range of 16-24 kHz or in some other range, so that they are generally inaudible to the human ear but capable of being detected by the audio transducer of a mobile device 130. In particular embodiments, each speaker node 126 comprises an electroacoustic transducer. The electroacoustic transducer emits a distinct inaudible acoustic signal. Each pixel 102 may comprise a mobile device 130 which has a processor 132 that executes software 133 stored in a memory or data storage 134 incorporated in the mobile device 130, which causes the mobile device 130 to perform the steps of listening for and recording the predetermined tones from the speakers 126, playing back and processing the recorded signals to determine a time difference of arrival (TDOA) of each tone, and, employing TDOA hyperbolic trilateration and/or multilateration methods, calculate the position of the pixel 102. The software instructions 133 that are stored in memory storage 134 may be provided for example, in a mobile application that is downloaded to the mobile device 130 prior to the lightshow. Alternately, the software instructions 133 may be stored in memory or data storage elsewhere that is accessible to the processor 132 or made available to the processor 132 over a suitable wireless connection.

To enable identification of speaker nodes 126 by their tone, a set of tone IDs may be defined, each tone ID corresponding to a particular tone. Particular embodiments provide up to 16 tone IDs, for a total of 16 unique tones. Each speaker node 126 is configured to emit a certain tone from this list of tones. The tones emitted by the speaker node cluster 129 may be chosen by a lightshow operator based on the acoustics of the venue 100. For example, in different settings, certain tones may work better in combination with one another to convey audio signals for trilateration and multilateration purposes. Typically the tones that are emitted by a particular speaker node 126 will remain the same throughout the lightshow.

In particular embodiments the cluster 129 of speaker nodes 126 are placed in a particular arrangement at the venue of the live event and at different heights to allow for three-dimensional positioning information to be determined for each pixel 102. The location information determined by each pixel using the methods and systems described herein is more precise than a GPS-determined location. For example, whereas GPS determines location coordinates to within approximately 8 meters of the actual location, the hyperbolic trilateration and multilateration methods and systems described herein have been applied to determine location of a pixel 102 to within approximately 1 meter of the pixel's actual location. Particular embodiments of the hyperbolic trilateration and multilateration methods and systems described herein have been applied to determine location of a pixel 102 to within 10 cm (or less) of the pixel's actual location.

The position of speaker nodes 126 may be determined using a laser distance and angle meter or suitable apparatus or methods for determining the position of objects. The speaker nodes' known coordinates may be entered into the lightshow control system 124 using GUI 123. The known coordinates of each speaker node 126 may be encoded in a venue configuration signal (e.g. having data packet structure as shown in FIG. 5C) and broadcast by beacon transmitter 122 to pixels 102 as described above to enable the determination of each pixel's location. In some embodiments, a plurality of fixed speaker nodes 126 at predetermined known locations can emit audio sounds to assist other speaker nodes 126 in the venue 100 to determine their locations, similarly to how pixels 102 determine their locations based on TDOA of recorded audio sounds emitted from speaker nodes 126. Once these other speaker nodes 126 have determined the coordinates for their locations, such information can be transmitted to the lightshow controller 124 to be included in the set of speaker node coordinates encoded in venue configuration signals.

FIG. 9 shows a top-plan view of an exemplary speaker node cluster 129 for a venue 100 comprising six speaker nodes 126A, 126B, 126C, 126D, 126E and 126F (individually and collectively, speaker nodes 126). Each speaker node 126 comprises a tone generator 128 (as seen in FIG. 2) that causes the speaker node 126 to emit an audio signal that is unique to the speaker node. In particular embodiments, the audio signals are emitted at the same time by all of the speaker nodes 126 in the cluster 129. A pixel 102 located at point x determines the coordinates for point x by receiving the sounds emitted by speaker nodes 126. Unless pixel 102 happens to be located equidistant to all of the speaker nodes 126, pixel 102 receives the audio signals at slightly different times due to the time that it takes for sound to travel to the pixel 102. By knowing the locations of each speaker node 126, the characteristics of the audio signals emitted by each speaker node 126 (e.g. which may be conveyed through tone IDs) and the speed of sound in the circumstances, pixel 102 can calculate its distance d from each speaker node 126. The speed of sound can be determined from a reading for current room temperature and the above mean sea level (AMSL) as inputs into the master controller software application and transmitted as part of a heartbeat signal as previously described. This calculated distance d defines a sphere 121 surrounding speaker node 126 which represents the set of possible locations for pixel 102 relative to that speaker node. In FIG. 9 for example, pixel 102 is located a distance $d_2$ from point $P_2$ which is a point on a sphere 121A surrounding speaker node 126A. Pixel 102 is located a distance $d_3$ from point $P_3$ which is a point on a sphere 121B surrounding speaker node 126B. Each sphere 121 is represented as a circle in FIG. 9 for ease of illustration. By looking for intersections of the spheres 121, the coordinates for pixel 102 in three-dimensional space can be determined using multilateration methods.

The positions of pixels 102 and speaker nodes 126 may be defined based on a three-dimensional Cartesian (x, y and z) frame of reference. For example, in FIG. 9 there is shown a Cartesian (x, y, z) coordinate frame of reference having a reference point at origin 151. For purposes of calculating the locations of pixels 102, it may be more convenient to translate the origin of the initial frame of reference by an origin offset $\{x_o, y_o, z_o\}$ to $(x+x_o, y+y_o, z+z_o)$. Origin offset information may be sent to mobile devices 130 as part of a venue configuration message. In other embodiments, a different type of coordinate system may be used for the frame of reference, such as, for example, a spherical or cylindrical coordinate system. In some embodiments a three dimensional coordinate system is not required. For example, mobile devices 130 that make up a lightshow display 103 may be located entirely on the same plane (e.g. an outdoor field, or level floor-only seating/admission in an arena). In such case, another suitable frame of reference may be used, such as one based on a Cartesian coordinate system in a plane (x, y) or a polar coordinate system. In some other embodiments, where mobile devices 130 are not all located on the same plane, their position projected onto a single plane can be used for identifying a location on a two-dimensional display 103 (defined for example in a Cartesian coordinate system in a plane).

Figure 10:
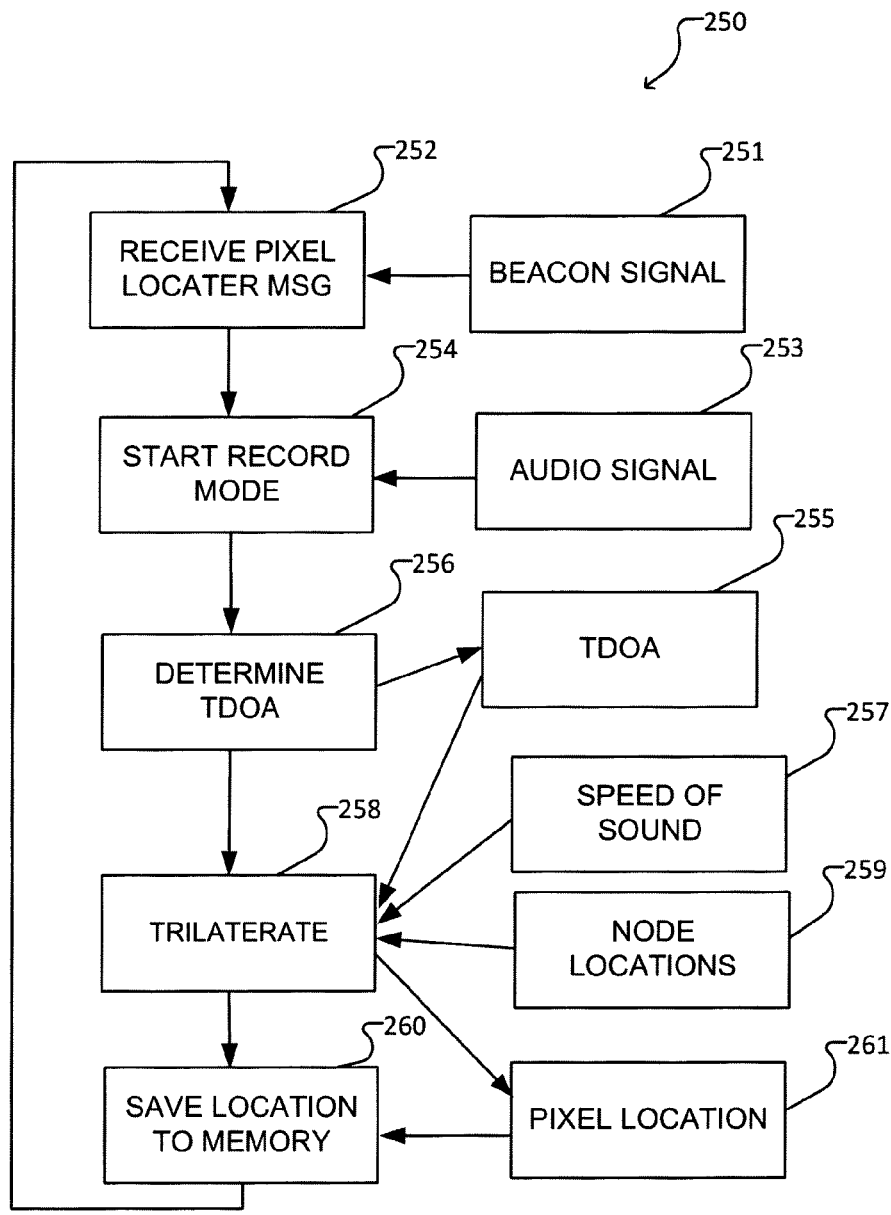
FIG. 10 illustrates a method performed by a processor of a mobile device for determining a location of the device.

A method 250 that may be executed by a processor 132 of mobile device 130 to determine its location is illustrated in FIG. 10. The steps of method 250 may be implemented as software instructions provided by a mobile application and stored in memory 133 of mobile device 130. Method 250 may be performed by mobile devices 130 while they are operating in a location-aware mode (and are therefore also receiving, through heartbeat signals and/or venue configuration signals, information about tone IDs, speaker node locations, and/or speed of sound needed for the mobile devices 130 to determine their locations). Method 250 begins at block 252 by receiving at a mobile device 130 a phone locator signal 251 from a beacon transmitter 122. This signal notifies the mobile device 130 that the speaker nodes 126 are about to emit an audio signal. The phone locator signal may be broadcast by beacon transmitter 122 every 10 seconds, for a recording period of 2 seconds, for example. This signal causes the mobile device 130 to be placed in record mode at block 254. While in record mode, the mobile device 130 records the audio signals or tones 253 received at the mobile device (i.e. by recording for a period of 2 seconds) and saves them to memory or data storage on mobile device 130. As described herein, the audio signals 253 are emitted simultaneously, and each speaker node 126 emits a unique audio signal. Once the audio signals are recorded, the mobile device 130 exits record mode (stops recording) and method 250 proceeds to block 256 where the mobile device 130 processes the recorded audio signals 253 using filtering and audio recognition functions, to identify the frequency of each audio signal and a TDOA 255 for each audio signal. Method 250 then proceeds to block 258 at which trilateration and multilateration functions are executed by a processor 132 of the mobile device 130 in order to determine the position of the mobile device 130. The functions executed at block 258 accept as inputs the TDOA values 255 determined at block 256, the known node locations 259 of the speaker nodes 126, tone IDs (the tones emitted by each speaker node 126), and the speed of sound 257 for the venue given the temperature and AMSL. The known speaker node locations 259, tone IDs, and the speed of sound 257 may be communicated to the mobile device 130 through one or more of venue configuration messages, heartbeat signal messages, and/or locate pixel messages. The output of block 258, i.e. a determined pixel location 261 for the mobile device 130, is saved to either memory or data storage, in block 260, so that it can be later applied to determine what action should be performed and/or image should be displayed by the mobile device 130 for any given time to produce a desired animated scene.

As seen in FIG. 2, each of speaker nodes 126 comprises a tone generator 128 that causes the speaker node to emit, in response to receiving a signal from positioning signal transmitter 125, a unique audio signal that is different from all of the other speaker node's audio signals. For purposes of the explanation herein the audio signal is referred to as a "tone" and the audio signal generator 128 is referred to as a "tone generator", but it is to be understood that the audio signal may alternately comprise a beep, chirp, and the like, or any other suitable audio signal that can be emitted by speaker nodes 126 and received by a mobile device 130 for performing TDOA trilateration and multilateration techniques. The tone generator 128 is controlled through commands provided by a master controller application (which may also be used to control the mobile devices 130 via beacon transmitter 122 as described above). The master controller application may accept inputs or commands from lightshow controller through a GUI 123. The commands generated by master controller application, when executed, cause a signal to be transmitted by positioning signal transmitter 125 to a receiver 127 of speaker node 126. The signal that is sent to the receiver 127 from positioning signal transmitter 125 may be an RF signal; in such case, positioning signal transmitter 125 is an RF transmitter. In other embodiments, the signal may be a WiFi signal or Bluetooth transmission or a signal using other suitable wireless transmission technology. As previously mentioned, the tones emitted by the speaker nodes 126 are preferably controlled to emit the sounds starting exactly at the same time (e.g. within 2 ms of each other, and in particular embodiments, within 1 ms of each other) to enable identification of TDOA for purposes of performing multilateration and trilateration. Each speaker node 126 incorporates configurable settings, wherein the settings determine what tone the speaker node 126 generates. In particular embodiments, the settings may be configured by lightshow controller 124 over an optical fiber, RF, WiFi, Ethernet connection or the like, to the speaker node. In particular embodiments, the tones may be stored as prerecorded .wav files on the speaker nodes 126.

RF and Bluetooth signals may introduce a lag time during signal transmission. This can adversely impact the accuracy of the image that is being displayed for the lightshow. One solution to this problem that the inventors have developed particularly in the case of RF signals is to send multiple, equally spaced apart RF signals from the positioning signal transmitter 125 to the speaker nodes 126. The speaker nodes 126 listen for and record each transmission, and when each arrives, the speaker node 126 determines which millisecond in the full second it received the signal at. For example, a speaker node 126 may clock its first signal at 50 ms from the start of the last second. It may clock the second signal at 56 ms from the start of the following second, and it may clock the third signal at 46 ms from the start of the final or third second. These three millisecond values of time are stored for analysis by the speaker node 126. The speaker node 126 takes the lowest number in the set of stored time values as the most accurate (which is 46 ms in the above example), and as the next second passes by, speaker node 126 waits until the most accurate time value (in ms) is reached. When it sees the most accurate number of the stored time values, the speaker node 126 generates and emits an audio signal. Because each node 126's clock is separate from other nodes' clocks and may not be in sync with the other nodes 126, the above-mentioned method ensures that the nodes emit an audio signal at exactly the same time (i.e. typically within 2 ms of each other, and more particularly, within 1 ms of each other in some embodiments).

To prevent errors and misfires in beep time, if the speaker node 126 recognizes that its stored millisecond values from the last round of received transmissions have a spread of more than a certain predetermined threshold (e.g. 10 milliseconds), then the node 126 refrains from emitting an audio signal that round. However, the other speaker nodes 126 may still proceed with emitting an audio signal. Redundancy may be provided in the speaker node cluster 129 by employing more than the minimum four speakers needed for trilateration (such as providing a cluster of six speakers as seen in FIG. 9) such that, if one or two speaker nodes 126 have determined that they need to sit out a round due to a poorly received transmission set, such speaker node(s) 126 do not generally prevent the effective operation of the speaker node cluster since the audio signals emitted by the remaining speaker nodes 126 can be used to determine a location of mobile device 130. Each speaker node 126 may comprise a single-board computer, microcontroller, or any other suitable processing and control unit that is configured to enable it to clock, store and process the arrival times of the RF control signals to control the generation of audio signals in synchronization with the other speaker nodes 126 as described above.

In some cases, tone objects (corresponding to a tone that a tone generator 128 will emit) are generated by a speaker node 126 in response to a signal received from positioning signal transmitter 125. On-the-fly generation of tone objects can introduce a lag time. This can adversely affect the accuracy of an image to be displayed. To address this problem, when an audio signal has been played by a speaker node, its tone object is destroyed from memory. A new tone object is pre-generated by running the tone generator script in advance and is stored in memory for instant playback as soon as the next appropriate signal is received. It can result in more reliable timing, for some embodiments, to erase the tone object from memory once it has been used, and pre-generate a new one for instant playback when called for.

Another problem is that echoes of tones emitted by speaker nodes 126 at a venue 100 can adversely affect the accuracy of an image being displayed on the display 103. The recording of echoes of the tones at a pixel 102 may result in inaccurate determinations of TDOA, therefore leading to an incorrect position being calculated using trilateration and multilateration. To mitigate the effects of echoes, each pixel 102 can be configured to listen for only the beginning of each tone from the speaker nodes 126. Once a tone is detected, pixel 102 is configured not to continue its search for that tone until a next round of tones is fired.

In particular embodiments, the audio signal that is emitted by each speaker node 126 is in the form of a chirp such as a short linear sine sweep. For example, signal one from a tone generator 128 of a first speaker node 126A could sweep from 19500 to 19600 Hz in 100 ms, signal two from a tone generator 128 of a second speaker node 126B could sweep from 19750 to 19850 Hz in 100 ms, etc. Other sweep ranges may be used in other embodiments. One advantage of using a chirp over a steady state tone is that cross correlation of recorded audio data for chirps has a more prominent peak. Cross correlation with a steady state sine resembles a triangle that is the width of the test signal. Another advantage is that in using a chirp, only a 100 ms blip, approximately, from each speaker is required for detecting the chirps and performing TDOA multilateration. Suitable audio circuitry can be integrated into the speaker node 126 system to produce the clear high-frequency outputs require for the tones, beeps or chirps generated by tone generators 128.

The self-determined location information obtained by performing method 250 of FIG. 10 allows pixels 102 to function as independently self-addressable pixels of the multi-pixel display 103. The pixels 102 can therefore be directed, based on their location, to perform a different action from other pixels 102 in the display 103. In this manner, more complicated scenes can be displayed than simply causing all the pixels 102 to display a monochrome color or causing all the pixels 102 to blink at the same time. For example, the pixels 102 can be made to display a moving spiral. This may be accomplished by incorporating in a master controller application a control layer 149 which contains a representation of the image displayed on display 103 as discussed above with reference to FIG. 8A. The image can be associated with a scene type that is encoded in the lightshow command signal, and which identifies what the display 103 should look like over a series of frames for a scene. By knowing its position within the display 103 representation on control layer 149, each pixel 102 can determine what it should be displaying for each frame of the scene. Display 103 can comprise a three-dimensional display where the mobile devices 130 are located at different heights in the venue 100 and where it is desirable to control devices 130 based on their location in three-dimensional space (e.g. by controlling mobile devices 130 in upper tiers of the venue differently from mobile devices 130 in lower tiers of the venue). Alternately, display 103 can comprise a two-dimensional display where the mobile devices 130 are located on the same plane in the venue 100, or not located on the same plane but it is desirable to control the devices as if their locations were projected on the same display plane (e.g. by taking into account only the (x, y) Cartesian plane coordinates of the pixel locations).

There are typically challenges associated with real time processing of audio signals for frequency detection due to the limitations on the processing capabilities of present mobile phone hardware. To accommodate a mobile device's capabilities, the audio signals emitted by the speaker nodes 126 can be recorded by a receiving mobile device 130 as raw audio data. Once the mobile device 130 leaves record mode or stops recording audio signals, then frequency detection and location placement can occur at that time based on the recorded audio data.

Hardware processing capabilities may vary across different mobile devices (e.g. such as for different smartphone models), which may cause the lighting effects to go out of sync after a short time period. By way of explanation, a key frame in animation, computer graphics and filmmaking is a drawing that defines the starting and ending points of any smooth transition. The drawings are called "frames" because their position in time is measured in frames. For lightshows produced by embodiments of the technology described herein, a key frame can be represented by a solid color or various shapes (i.e. one key frame will have the screen a solid green color, the next key frame will have the screen a solid red color). The amount of time that it takes an animation to go from one key frame to the next key frame is defined by the frame rate. The frame rate is determined by the mobile device's hardware. Not every device's hardware is the same, so although the frame rate would be similar in many devices, after an effect is played across multiple devices (e.g. a looping gradient of red and green) for a certain period of time, there may be a noticeable drift in the timing of the gradient between the devices, thereby creating a messy or non-synchronized visual effect. Instead of having the animations operate on a frame rate, as typical animations would, in particular embodiments the mobile application running the animations on the mobile devices in accordance with the lightshow commands may be based on the low level system clock on the mobile device which vibrates at a specific frequency, normally measured in MHz (megahertz, or millions of cycles per second) and is typically implemented as a count of the number of ticks (or cycles) that have transpired since some arbitrary starting time. As system time is extremely accurate between mobile devices, it can be used to harmonize the timing of effects across multiple devices. Between key frames, which are for example every 25 milliseconds, it can be calculated timewise where the animation should be along its progress line. If the animation is ahead of schedule or lagging behind where it should be with reference to the system clock, the animation is recalculated and redrawn in order for it to stay on schedule, thereby keeping each mobile device's animations in synchronization with all of the others.

As described above, a master controller application can be provided to enable a lightshow operator to control one or more of: the beacon transmitter(s) 122, speaker nodes 126, and/or the positioning signal transmitter 125. GUI 123 is provided by the master controller application to facilitate this control. In particular embodiments, master control over the beacon transmitter 122, speaker nodes 126 and the positioning signal transmitter 125 can be effected in real time via a suitable input device or hardware, such as a mouse, keyboard, touchscreen, MIDI hardware, or DMX hardware. In some embodiments, commands issued by the master control can be preprogrammed and/or manipulated in a MIDI sequencer or programmable DMX hardware/software.

In some embodiments, beacon transmitter 122 comprises a mobile beacon transmitter which can be carried by a person or on a movable object or vehicle such as a drone. As such, the location of the beacon transmitter 122 within a live events venue 100 can be varied. The mobile beacon transmitter 122's location can remain constant throughout a live event, or it can move either periodically or constantly throughout a live event so as to create localized lightshow effects in the region of the beacon transmitter 122, as only the mobile devices 130 that are within range of the mobile beacon transmitter are capable of receiving and responding to the beacon transmitter's signals. More than one such mobile beacon transmitter 122 may be employed within a venue 100 and carried by a person or movable object or vehicle in order to broadcast lightshow command signals and other signals for producing a lightshow as described above, in order to generate multiple, moving localized lightshow effects during a live event.

Figure 11:
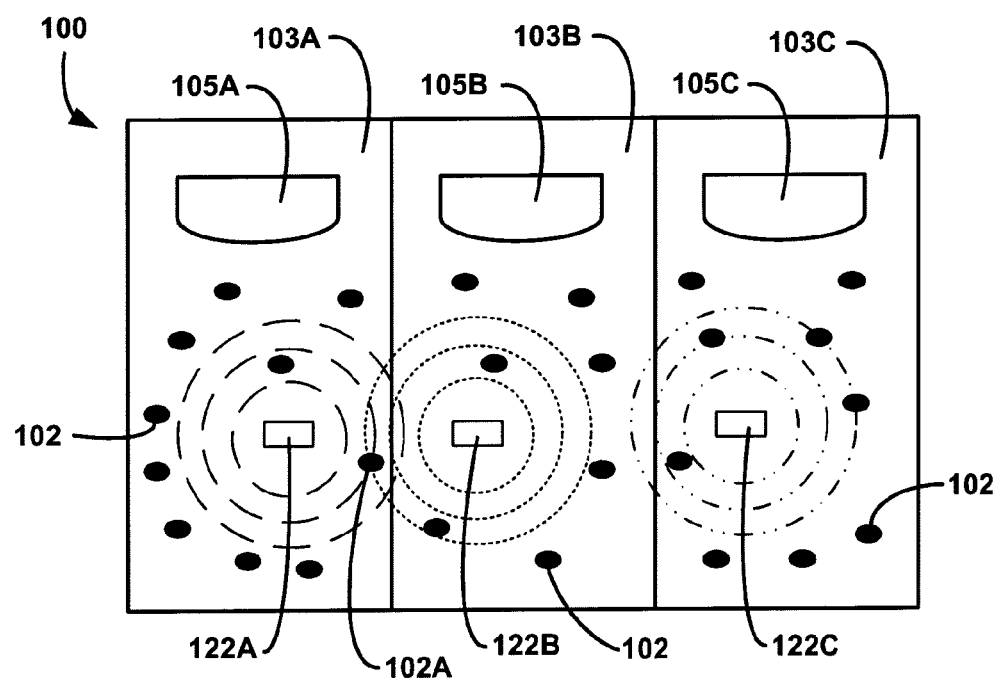
FIG. 11 schematically shows a top plan view of a venue having multiple geo-fenced regions with different lightshows.

In particular embodiments, as illustrated by FIG. 11, venue 100 may be one at which multiple shows are occurring. Such shows may occur concurrently across multiple stages 105A, 105B and 105C (individually and collectively, stage 105). Each of these shows may be associated with a different lightshow display 103A, 103B and 103C (individually and collectively, lightshow display 103). The boundary of each display 103 is defined by a geo-fenced region, wherein pixels within a particular geo-fenced region are controllable to display an image that is different than the image being displayed in the other geo-fenced regions. Beacon transmitters 122A, 122B, and 122C (individually and collectively, beacon transmitters 122) located within each of displays 103A, 103B and 103C respectively, broadcast signals to control the pixels 102 to produce a particular image for display. For example, beacon transmitter 122A broadcasts signals to direct pixels 102 within the geo-fenced region of display 103A to produce an image on display 103A. Likewise, beacon transmitter 122B broadcasts signals to direct pixels within the geo-fenced region of display 103B to produce an image on display 103B.

Sometimes, a mobile device 130 providing pixel 102 may be in range of and receive signals from beacon transmitters 122 of different geo-fenced regions. To enable the mobile device 130 to determine which signal to use, the signals emitted by beacon transmitters 122 may be encoded with a particular display ID, identifying one of the displays 103 with which the transmitter is associated. In the example of FIG. 11, pixel 102A receives signals from both beacon transmitter 122A encoded with the display ID corresponding to display 103A and from a beacon transmitter 122B encoded with the display ID corresponding to display 103B. A lightshow mobile application loaded onto the mobile device 130 that provides pixel 102A may instruct the device to execute a method whereby it determines a location of pixel 102A and uses that location to determine which beacon signals the device should be responsive to. In the illustrated example of FIG. 11, the determined location of pixel 102A is compared against a predetermined boundary of each display 103 to determine that pixel 102A is located within display 103A. Accordingly, the instructions provided on the lightshow mobile application on mobile device 130 may instruct it to ignore any beacon signals that have a display ID that does not match display 103A. Pixel 102A therefore ignores beacon signals from beacon transmitter 122B and is responsive only to beacon signals from beacon transmitter 122A. Thus, pixel 102 participates in the production of lightshow display 103A rather than lightshow display 103B.

The location of a pixel 102 may be determined using one or more of the methods as described elsewhere herein. For example, where the venue 100 is set up with a plurality of speaker nodes as described herein, the location-aware method 250 of FIG. 10 may be used by the mobile devices 130 providing pixels 102 to determine their own location. In other embodiments, one or more other methods may be used to determine the location of pixel 102. For example, where the mobile device 103 providing pixel 102 is a GPS (Global Positioning System)-enabled device, then a determination of the device's latitude and longitude GPS coordinates may be used to select which beacon signals the pixel 102 should be responsive to based on the predefined geo-fenced boundary for each display 103. Use of GPS for location determination may be suitable where the venue 100 is an outdoor venue, for example, within range of signals from GPS satellites.

Geo-fenced regions may also be used for an event with a single show (e.g. a single show occurring in a large indoor or outdoor venue). In such embodiments the venue space may be divided into two or more displays 103 (such as the geo-fenced displays 103A, 103B, 103C, etc. as shown in FIG. 11), each of which displays a different image. Similarly to the methods described above, the signals broadcast by beacon transmitters 122 within each geo-fenced region may be encoded with a display ID identifying the display associated with the transmitter, to enable mobile devices 130 receiving signals from beacon transmitters 122 of different geo-fenced regions to select which signals to be responsive to.

Figure 12:
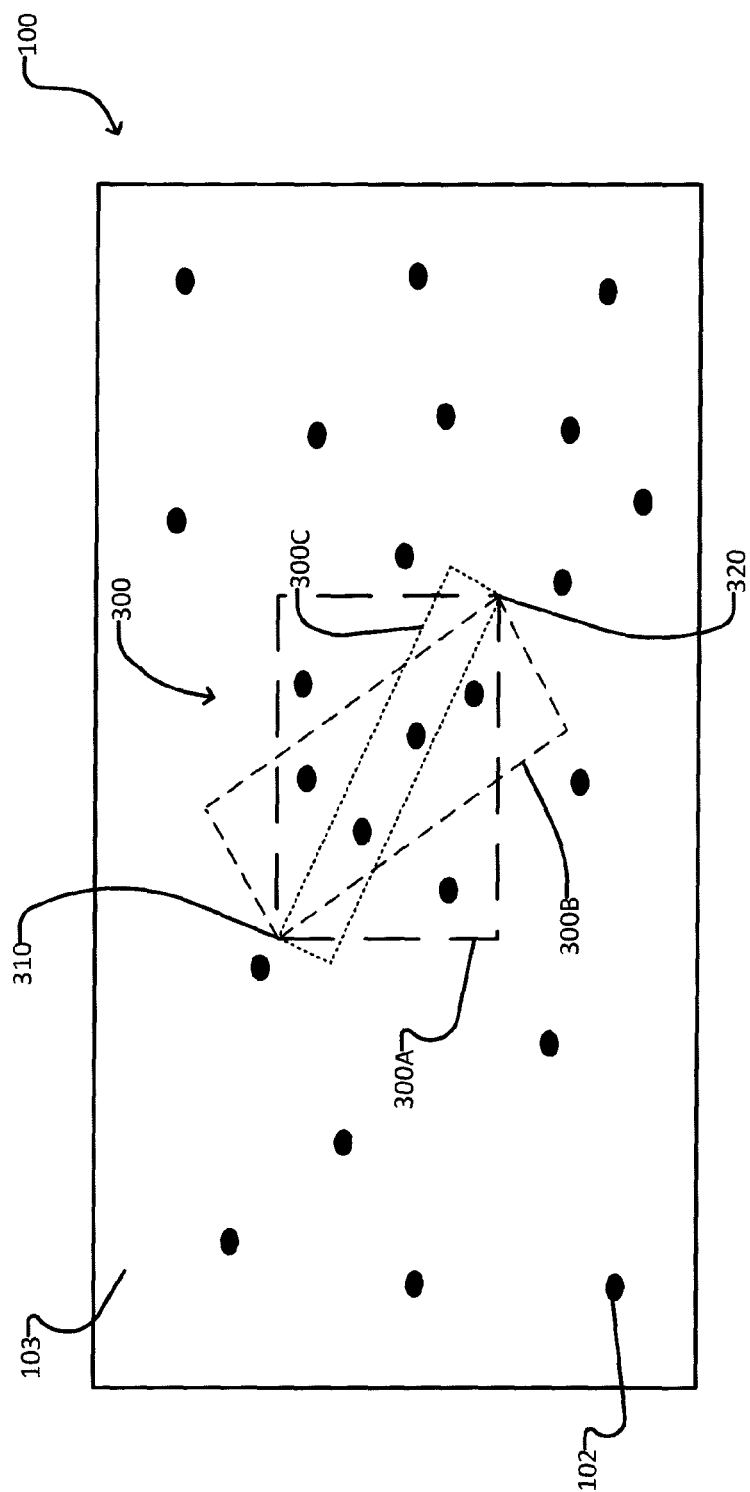
FIG. 12 schematically shows a top plan view of an example venue with a varying rectangular display region.

In particular embodiments, as seen in FIG. 12, mobile devices 130 to be used as pixels 102 in display 103 may be directed to perform a lightshow sequence featuring a varying rectangular area 300. Rectangular area 300 may vary between each frame or each scene of a lightshow (e.g.

varying in its dimensions, position and/or rotation angle across a display 103). Rectangular area 300 may be defined and communicated to the mobile devices 130 via broadcast beacon signals using the systems and methods described herein. Rectangular area 300 may be defined in particular embodiments by the coordinates of a first corner 310, coordinates of a second, diagonally opposite corner 320, and a rotation value. The rotation value defines the shape and size of rectangular area 300 incorporating diagonally opposite corners 310, 320. For example, as seen in FIG. 12, rectangular areas 300A, 300B, 300C have the same corners 310, 320 but different rotation values. If a mobile device 130 providing pixel 102 determines that its location is within rectangular area 300, instructions provided to mobile device 130 (via the mobile application on mobile device 130) may direct it to respond to the lightshow commands encoded on the beacon signals (e.g. by turning on its display screen). Otherwise, if mobile device 130 determines that its location is not within the rectangular area 300, instructions provided to the mobile device 130 may direct it to perform another action (e.g. turn off its display screen). Venue 100 shown in the FIG. 12 embodiment may be an outdoor venue. Where GPS signals are being used by the mobile devices 130 to determine their location, the corners 310, 320 of rectangular area 300 may be defined by latitude, longitude GPS coordinates. One advantage of representing the area 300 as two corners and a rotation value is that it reduces the amount of data that needs to be relayed to and processed by each mobile device 130 (as compared to, for example, transmitting all four corners of the area 300 in latitude, longitude GPS coordinates).

In some embodiments, display screen 131 of mobile device 130 may be used to view a live event. In some embodiments, display screen 131 may display augmented reality media over a view of the live event. Augmented reality media may include, for example, images, spirals, swirls, moving lines, three dimensional animations and/or other effects, or any other animation or image. In some embodiments, augmented reality media may be communicated to mobile devices 130 using beacon transmitters 122. In some embodiments, augmented reality media may be preloaded onto mobile devices 130. In some embodiments, augmented reality media displayed on a display screen 131 is dependent on a location of mobile device 130. For example, mobile devices 130 at different locations within venue 100 may view augmented reality media having different media, viewing angles, sequences and/or the like. Any of the methods described above may be used to determine the location of mobile device 130.

In some embodiments, mobile devices 130 enable the collection of demographic information relating to attendance at a live event. For example, when an event attendee signs in to mobile device 130 to use mobile device 130 as a pixel 102 using a social media account, mobile device 130 may anonymously collect demographic data such as age, gender and/or the like using data from the event attendee's social media. The demographic data may, in some embodiments, be communicated to a central database for storing and analysis. In some embodiments, the demographic data may be communicated to an event organizer.

Embodiments of the technology described herein may be adapted to enable remote audience members to participate remotely in live events that are streamed or broadcast to the remote audience members. For example, remote audience members may be located at one or more different venues which are located at some distance from the live events venue 100, such as at a restaurant, pub, residence, community center, indoor or outdoor stadium, arena, bowl, concert hall, theater, amphitheater, grandstand, field, beach, or other open area or any other to venue located remotely from the venue 100 at which the live event is occurring. These remote audience members may be watching a broadcast or live stream of the event on a display screen, such as, for example, a television screen, projection screen, computer screen, or other display. The signals that are transmitted by beacon transmitter 122 to the mobile devices 130 of the audience members at the live events venue 100 may also be adapted for communication to mobile devices 130 of the remote audience members at remote venues. For example, certain information that is contained in the lightshow command signals and heartbeat signals that are broadcast by beacon transmitters 122 to mobile devices 130 at the venue 100 may also be transmitted to the mobile devices 130 of the remote audience members through suitable communication means. This may include Internet communication, through for example WiFi or cellular networks, or any other suitable communication network for communicating with the mobile devices 130. The remote mobile devices 130 run a mobile application that enables the mobile devices 130 to receive, interpret and process the signals to perform certain actions, including blinking or turning on/off the display screen and displaying a particular color when on, similarly to the lightshow participation actions performed by the mobile devices 130 that are physically present at the live events venue 100. Similar heartbeat signal information may be communicated to remote mobile devices 130 to enable the timing of their lightshow display actions to be synchronized with other remote mobile devices and those located at the live events venue 100. In this manner, even persons who are not physically present at the live events venue 100 may engage remotely in the audience participation lightshow and use their mobile device 130 to contribute to enhancing their own experience as well as those around them. In cases where the live event is pre-recorded and the broadcast or live stream is time delayed and/or provided at different times for different regions, the transmission of lightshow command signals and heartbeat signals may account for the time delay or time differences by ensuring that the stream of signals is communicated to the mobile devices 130 at the appropriate time to match the timing of the broadcast or live stream of the event. This determination may be based on, for example, a known geographical location of the mobile devices 130 which can be used to identify a time zone of the mobile device 130 and expected timing of the broadcast/live stream that is being observed by the operator of the mobile device 130.

Interpretation of Terms

Unless the context clearly requires otherwise, throughout the description and the claims:
  "comprise", "comprising", and the like are to be construed in an inclusive sense, as opposed to an exclusive or exhaustive sense; that is to say, in the sense of "including, but not limited to";
  "herein", "above", "below", and words of similar import, when used to describe this specification, shall refer to this specification as a whole, and not to any particular portions of this specification;
  "or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Embodiments of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs")). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a computer system for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Embodiments of the invention may also be provided in the form of a program product. The program product may comprise any non-transitory medium which carries a set of computer-readable instructions which, when executed by a data processor, cause the data processor to execute a method of the invention. Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer-readable signals on the program product may optionally be compressed or encrypted.

The invention may be implemented in software. For greater clarity, "software" includes any instructions executed on a processor, and may include (but is not limited to) firmware, resident software, microcode, and the like. Both processing hardware and software may be centralized or distributed (or a combination thereof), in whole or in part, as known to those to skilled in the art. For example, software and other modules may be accessible via local memory, via a network, via a browser or other application in a distributed computing context, or via other means suitable for the purposes described above.

Where a component (e.g. a software module, processor, server, client, mobile device, pixel device, speaker, transmitter, receiver, beacon, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

The invention claimed is:

1. A lightshow control system for generating a lightshow across a plurality of pixel devices, the lightshow control system comprising:
   a controller configured to receive input from a lightshow operator and to generate a plurality of lightshow parameters based on such input, wherein the plurality of lightshow parameters include location-based display actions;
   a beacon transmitter in communication with the lightshow controller and configured to receive the plurality of lightshow parameters from the lightshow controller, encode the plurality of lightshow parameters on a beacon signal, and broadcast the beacon signal to the plurality of pixel devices, wherein each of the plurality of pixel devices is configured to receive and decode the beacon signal to perform selected location-based display actions for the lightshow wherein the beacon transmitter is configured to encode a timing reference on the beacon signal to synchronize initiation of the location-based display actions across the plurality of pixel devices; and
   a positioning signal transmitter and a plurality of speaker nodes in communication with the positioning signal transmitter, wherein to each one of the plurality of speaker nodes the positioning signal transmitter transmits a tone generation signal and in response to receiving the tone generation signal the speaker node emits an audio signal for trilateration and/or multilateration by the plurality of the pixel devices, each of the plurality of pixel devices determining its pixel location and selecting the location-based display actions to perform based on its self-determined pixel location;
   wherein the beacon transmitter comprises a Bluetooth Low Energy (BLE) beacon transmitter configured to transmit the beacon signal as a BLE signal;

wherein the beacon transmitter is configured to broadcast the beacon signal as one or more batches of repeated data packets; and wherein the beacon transmitter is configured to facilitate recognition and processing of each batch of data packets by the pixel device by updating the transmitter's Media Access Control (MAC) address to encode a new MAC address for each batch of data packets and by encoding a new identification number on the beacon signal for each batch of data packets.

2. The system according to claim 1 wherein the timing reference comprises a time since a starting reference point.

3. The system according to claim 2 wherein the starting reference point comprises a first beat of the lightshow or a first beat of the current lightshow scene.

4. The system according to claim 1 wherein the beacon transmitter is configured to broadcast the beacon signal so that the time between transmission of successive data packets in each batch is $t_m$, wherein $t_m$ is between 15 ms to 30 ms, and the timing reference encoded in each of the data packets subsequent to the first data packet is incremented by $t_m$ from the timing reference encoded in the preceding data packet.

5. The system according to claim 1 wherein each batch of repeated data packets comprises 15 to 25 data packets.

6. The system according to claim 1 wherein based on the plurality of lightshow parameters, the beacon transmitter is configured to encode a play scene command on the beacon signal, wherein the play scene command is defined by one or more of: a scene type, a set of color IDs, a gradient speed, a scene transition, and Beats Per Minute (bpm).

7. The system according to claim 1 wherein based on the plurality of lightshow parameters, the beacon transmitter is configured to encode a heartbeat message on the beacon signal, wherein the heartbeat message is defined by the timing reference and one or more of: bpm, a beat mode type, a time signature and a speed of sound.

8. The system according to claim 1 wherein the audio signal is an ultrasonic audio signal.

9. The system according to claim 1 wherein the audio signal is characterized by a frequency in the range of 16 kHz to 24 kHz.

10. The system according to claim 8 wherein each one of the plurality of speaker nodes is configured to emit the audio signal simultaneously with the other speaker nodes.

11. The system according to claim 10 wherein each one of the plurality of speaker nodes comprises a tone generator, an amplifier and an omnidirectional speaker array which are configured to produce the audio signal, wherein the audio signal comprises a tone that is characterized by a frequency which is different from the other speaker nodes.

12. The system according to claim 10 wherein each one of the plurality of speaker nodes comprises a tone generator, an amplifier and an omnidirectional speaker array which are configured to produce the audio signal, wherein the audio signal comprises a chirp that is characterized by increasing and/or decreasing frequency over time which is different from the other speaker nodes.

13. The system according to claim 1 wherein the positioning signal transmitter comprises a Radio Frequency (RF) transmitter configured to transmit the tone generation signal as an RF signal, and each one of the plurality of speaker nodes comprises an RF receiver for receiving the RF signal from the positioning signal transmitter.

14. The system according to claim 13 wherein the positioning signal transmitter is configured to transmit the tone generation signal as a plurality of RF signals at equally spaced time intervals to the plurality of speaker nodes, and upon receiving each RF signal, each of the speaker nodes is configured to clock the time elapsed since the start of the preceding time interval and determine a signal generation time period based on a set of clocked times.

15. The system according to claim 14 wherein each of the speaker nodes is configured to take the lowest of the set of clocked times as the signal generation time, wherein the speaker node generates and emits the audio signal when the signal generation time period following the start of the next time interval has elapsed.

16. The system according to claim 14 wherein each of the speaker node is configured to refrain from emitting an audio signal if the times within the set of clocked times have a spread of more than a certain predetermined threshold.

17. The system according to claim 1 wherein the plurality of speaker nodes comprises four or more speaker nodes.

18. The system according to claim 17 wherein the plurality of speaker nodes comprises six speaker nodes.

19. The system according claim 17 wherein at least one of the plurality of speaker nodes is positioned at a different height from the other speaker nodes.

20. The system according to claim 1 wherein based on the plurality of lightshow parameters, the beacon transmitter is configured to encode a venue configuration message on the beacon signal, wherein the venue configuration message is defined by one or more of: a set of speaker node locations, a set of speaker node tone IDs, and an origin offset.

21. The system according to claim 1 wherein based on the plurality of lightshow parameters, the beacon transmitter is configured to encode a locate pixel message on the beacon signal, wherein upon receiving the locate pixel message each one of the plurality of pixel devices starts recording for audio signals emitted by the plurality of speaker nodes.

22. The system according to claim 1 wherein the controller comprises a display and is configured to provide a graphical user interface via the display to receive input from the lightshow operator and enable dynamic and real time generation and modification of the plurality of lightshow parameters based on such input.

23. A method performed by a pixel device for contributing to a lightshow display across a plurality of such pixel devices, the method comprising:

scanning for and receiving at the pixel device a beacon signal broadcast from a beacon transmitter comprising a Bluetooth Low Energy (BLE) beacon transmitter configured to broadcast the beacon signal as one or more batches of data packets, wherein the beacon transmitter facilitates recognition and processing of each batch of data packets by the pixel device by updating the beacon transmitter's Media Access Control (MAC) address to encode a new MAC address for each batch of data packets and by encoding a new identification number on the beacon signal for each batch of data packets;

decoding the beacon signal to determine a plurality of lightshow parameters, wherein the plurality of lightshow parameters include location-based display actions; and performing selected location-based display actions for the light;

wherein the method further comprises: the pixel device scanning for and receiving a heartbeat signal broadcast from a beacon transmitter; decoding a timing reference from the heartbeat signal; and initiating the location-based display actions at a start time based on the timing reference;

the pixel device recording a plurality of audio signals emitted concurrently from a plurality of speaker nodes, wherein each speaker node emits an audio signal in a frequency distinct from the other speaker nodes;

the pixel device filtering and processing the plurality of audio signals based on their distinct frequencies to determine differences between time of arrival for each audio signal (TDOA);

the pixel device receiving location information for each of the plurality of speaker nodes; and based at least in part on the TDOA and the location information, the pixel device determining the location of the pixel device using trilateration and/or multilateration and selecting the location-based display actions to perform based on the self-determined location of the pixel device.

24. The method according to claim 23 wherein the location-based display actions comprises one or more of: displaying at least one image or a series of images on a display screen of the pixel device; flashing a light source on the pixel device; and vibrating the pixel device.

25. The method according to claim 24 wherein the location-based display actions comprises displaying a scene for the lightshow, wherein the scene comprises a sequential display of colors displayed on a display screen of the pixel device.

26. The method according to claim 25 wherein the scene is characterized by one or more of: a scene type, a set of color IDs, a gradient speed, a scene transition, and bpm.

27. The method according to claim 23 wherein the pixel device comprises a Bluetooth receiver and scanning for the beacon signal comprises scanning for a BLE beacon signal.

28. The method according to claim 23 comprising: in response to not receiving the heartbeat signal within a heartbeat timeout period, stopping the one or more display actions and/or restarting the Bluetooth receiver.

29. The method according to claim 23 wherein the timing reference comprises a time since a starting reference point.

30. The method according to claim 29 wherein the starting reference point comprises a first beat of the lightshow or a first beat of the current lightshow scene.

31. The method according to claim 23 wherein the pixel device comprises a handheld mobile device, such as for example, a smartphone or a tablet.

32. The method according to claim 23 wherein the location information is decoded from a beacon signal transmitted by the beacon transmitter.

33. The method according to claim 23 wherein the plurality of sound signals is emitted by at least four sound speaker nodes.

34. The method according to claim 33 wherein the plurality of sound signals is emitted by six speaker nodes.

35. The method according to claim 23 wherein selecting the location-based display actions to perform comprises receiving display commands for an animated scene and identifying the location-based display actions to be performed by the pixel device based on its corresponding location in a display representation of the animated scene.

* * * * *